Sept. 22, 1953 G. E. SLEEPER, JR 2,653,182

MULTICOLOR TELEVISION

Filed May 13, 1949 7 Sheets-Sheet 1

Return Lines Shown With Zero Time Allowance For Snap-Back. Also With No Recognition Of Normal Return-Line Blanking.

INVENTOR.
GEORGE E. SLEEPER, JR.
BY
Lippincott & Smith.
ATTORNEYS.

Sept. 22, 1953 G. E. SLEEPER, JR 2,653,182

MULTICOLOR TELEVISION

Filed May 13, 1949 7 Sheets-Sheet 2

INVENTOR,
GEORGE E. SLEEPER, JR.
BY
Lippincott & Smith.
ATTORNEYS.

Sept. 22, 1953 G. E. SLEEPER, JR 2,653,182

MULTICOLOR TELEVISION

Filed May 13, 1949 7 Sheets-Sheet 3

INVENTOR.
GEORGE E. SLEEPER, JR.
BY
Lippincott & Smith
ATTORNEYS.

INVENTOR.
GEORGE E. SLEEPER, JR.
BY
Lippincott & Smith,
ATTORNEYS.

Sept. 22, 1953 G. E. SLEEPER, JR 2,653,182

MULTICOLOR TELEVISION

Filed May 13, 1949 7 Sheets-Sheet 5

INVENTOR.
GEORGE E. SLEEPER, JR.
BY
Lippincott & Smith
ATTORNEYS.

INVENTOR,
GEORGE E. SLEEPER, JR.
BY
Lippincott & Smith.
ATTORNEYS.

INVENTOR,
GEORGE E. SLEEPER, JR.
BY
Lippincott & Smith.
ATTORNEYS.

Patented Sept. 22, 1953

2,653,182

UNITED STATES PATENT OFFICE 2,653,182

MULTICOLOR TELEVISION

George E. Sleeper, Jr., Berkeley, Calif., assignor to Color Television, Inc., San Francisco, Calif., a corporation of California Application May 13, 1949, Serial No. 93,122

40 Claims. (Cl. 178—5.2)

This invention relates to color television apparatus. It is particularly concerned with ways and means by which additive tricolor television transmission and reception may be brought about without the utilization of any additional frequency band width over that which is presently required for black-and-white monochrome television images of like detail.

According to presently recognized standards for the transmission of television images and for high fidelity reception thereof, a frequency band of six megacycles is allotted. In the transmission, the video carrier frequency upon which the video signal modulation is to appear is spaced normally at 4.5 megacycles from the center frequency of the sound, or audio, carrier. With the so-called vestibial sideband method of transmitting the video information, the video signal modulation on the lower side of the picture carrier is maintained substantially unattenuated out to a band width of approximately 0.75 megacycle after which attenuation occurs and the signal modulation has substantially disappeared at a frequency separation of approximately 1.25 megacycles from the video carrier frequency. At the other side of the video carrier frequency the video modulation appears as an unattenuated amplitude modulated signal (assuming the transmitter characteristic to be flat) for a band width of approximately 4.0 megacycles, after which attenuation occurs and the video modulation is substantially absent at a frequency separation from the video carrier frequency corresponding to that point at which the center frequency of the audio carrier appears. The video modulation customarily is amplitude modulation, while the accompanying sound or audio signal appears as a frequency modulation on the audio carrier. The total allotted band width for the combined video and audio transmissions, with presently existing standards later to be explained, is 6 megacycles.

In the consideration of standards of transmission still other factors must be considered, among which are those of the number of line representations in which the television image raster is to be traced; the number of complete television image frames which must be reproduced each second; the number of image fields which must be reproduced each second; and also the interlace relationship to establish the number of fields per frame. Presently existing standards call for transmitting the television image in 525 lines per image, or picture frame, with 30 such picture frames (60 picture fields) being transmitted each second and the lines of each picture field being interlaced with respect to each other in an interlace relationship of two to one (2:1).

The foregoing standards are based upon a so-called transmission of black-and-white, or monochrome, television images. Heretofore when efforts have been made to transmit color television images the proposals for carrying forward such objectives involved the utilization of so-called additive multi-color sequential color field television transmissions or the so-called additive simultaneous multi-color television proposals. Where recourse was had to the so-called sequential methods, the proposition is the sequential repetition of complete image fields in selected different component colors of, for instance, a tricolor operation (usually a red, a green and a blue). The sequential method must be of the additive type. In such methods the resolution of each image frame produced is complete and the image is normally represented in the total number of lines into which it is to be divided. The result is that for a 525 line television image the band width required with a sequential field method of operation is, for all practical purposes, three times that required for normal black-and-white transmissions. The field sequential method of color television is very much subject to objections from the standpoint that both color flicker and color action fringes usually occur, which, of course, are objectionable. Furthermore, the brightness of the resulting image is often greatly reduced. Still further, and even more significant, is the fact that the usual and normal black-and-white television receiver is incapable satisfactorily to receive the sequential field signal transmission to recreate therefrom a black-and-white representation of what had initially been transmitted in color. The main reason for this is the greatly increased field frequency over that for which a black-and-white receiver is designed.

In the so-called simultaneous method the objections of color flicker and color fringe effects are no longer present, for all colors are represented continually. However, each color is continually transmitted, and even though it has been proposed the total detail transmitted in the individual colors may vary and not be complete for all colors, it is nonetheless a fact that the actual band width required for the transmission is very considerably greater than that required for normal black-and-white. One of the distinguishing characteristics of the simultaneous method over the sequential method is that the simultaneous operation does not depend upon the visual persistence of each one of the groups of color images, because all colors are simultaneously present. With respect to the sequential method, where the several color fields are transmitted in sequence, the system is directly dependent upon the visual persistence of the looker, and because in methods heretofore used complete color fields have been transmitted in individual colors, there is inherently present the component color flicker between the color fields, and the color action fringes necessarily become of significant importance because of the time delay between producing like or adjacent points of the image in the different colors.

According to the present invention, it is proposed to transmit the color television image in such a way that the video or image signals when received at receiving points shall be capable of utilizing normal completely unchanged black-and-white television receivers designed to receive the hereinabove-mentioned standard type of transmission. The color image signals so received will then appear on such a standard black-and-white television receiver as a black-and-white monochrome image of exactly present operational standard characteristics. On the other hand, by taking recourse to the teachings of this disclosure, the same types of images, when received on a color television receiver, can be utilized to produce or control the production of television images according to an additive color principle in substantially natural color.

The aforesaid result is accomplished in its broadest sense through the generation and development of a phase control pulse intermingled with certain of the normal pulses used to synchronize the ordinary black-and-white television receivers. The special color phasing control pulse becomes effective in the normal black-and-white television receiver in a manner exactly like that of the normal line synchronizing impulse. However, in the color television receiver, the color phasing pulse is selected from other line synchronizing pulses in such a way as to control and regulate the order in which the different colors are developed.

Essentially, the apparatus developed for receiving the color television images according to the present invention makes a selection at the receiver point of the various color phasing signals and thereby controls in a line-for-line manner that color in which each line of the reproduced image or picture raster is to be reproduced. When viewing the image raster in its colors the reconstitution of the image occurs in such a way that adjacently produced and recreated image raster lines appear in progressively changing colors, so that collectively in a tricolor system sequentially produced lines of the reproduced picture will always appear in a certain selected sequence or order, such, for example, as red, green and blue, after which these will repeat. The significant characteristic present, according to the invention herein to be described, is that interspersed between successively produced lines of the first recreated image raster are other series of lines filling in, in each instance, between any two successive lines of the phase image field, that third component color which is missing, so that, considering any two successive fields, each three adjacent lines will appear in all chosen colors of the tricolor arrangement. Then, after the production of each second color field, the phase of the controlling pulse to develop and regulate the color sequence is shifted, so that the order of recreating the different lines in the different colors is varied. Essentially, this plan comprises the scanning of each two successive fields of the image raster according to normal black-and-white line interlaced pattern procedures, and for scanning according to present standards a full 525-line picture with all colors appearing in each picture field and all colors being repeated in a selected cyclic order spaced from one another and in the same repeating sequence. After the completion of two such image fields, which will provide a standard line-interlaced pattern for present standards of 2:1 interlace with a 525-line image raster frame, the complete interlaced pattern is changed insofar as the order of color repetition is concerned. The colors then appear in the new order of an unchanging sequence repeating according to the above outlined plan for the next two fields. The shift at this time, for instance, may have been such as to shift the line scanning order ahead by one line, or behind by one line in the interlace pattern, as the case may be and for illustrative purposes. At the time the fourth field has been traversed so as to provide a second 525-line picture frame, which would be superimposed upon the first above described picture frame, a second shift in the color order for the different line scannings occurs. At this time the shift may be again one line ahead or, for instance, two lines back, to produce the lines of the third picture or image raster frame in still further changed color order, but still interlaced in the same 2:1 relationship hereinabove described. After the third picture image frame has been completed and embodies a third 525-line 2:1 interlaced line pattern, the color order is again shifted, in a manner similar to that above described, to follow again the plan of the phase relationship hereinabove outlined image field production for the first frame.

According to the method just described, it will be appreciated that the shift in color sequence has been suggested as occurring for each line of the picture, but also it will be appreciated that the same general results might be had if a similar shift occurred during different parts of each picture line, or even if the shift occurred between successively produced picture points. The significant feature is the fact that a shift in the color order is developed and effectively amounts to a change in the color sequence through a change in the relationship of the color scanning order.

Considered from another viewpoint, the image raster is recreated by deflecting a cathode ray beam across a cathode ray tube viewing screen or target responding to the beam to produce different color or light, in such a way, for instance, that the bi-dimensional image raster pattern is controlled under the influence of two separate deflection control devices, which usually are in the form of electromagnetic deflection coils or electrostatic deflection plates in which the field effective upon the cathode ray beam is built up to follow a saw-tooth pattern. Such a saw-tooth pattern usually occurs at relatively low frequency in the vertical deflection of the scanning beam (according to present standards, 60 vertical deflections per second occur), and at a relatively high rate in the horizontal or line deflection direction (according to present standards, 15,750 separate image lines are produced each second, so that in a single vertical deflection of the cathode ray beam 262½ image lines on the raster will have been traced and each picture frame is formed of 525 image line traces).

Combined with the aforesaid type of beam deflection control which provides the standard 2:1 interlace pattern for black-and-white image reception, there is a separate phase control signal operative at the time of completion of each separate image raster field. This latter control becomes effective on one of the two deflection control instrumentalities to modify its phase relative to the other generator according to a change in the color sequence or order desired. The increment of change is determined by the normal cyclic duration of the vertical or low-speed deflection control, divided by the number of colors selected in the additive multi-color image to be recreated. In a tricolor system this, of course, is a unit of three, and thus becomes effective to provide a color interlace combined with the normal order line interlace pattern for recreating the desired image.

The effect of the change in color sequence while of paramount importance in the color operation is of no special significance or importance whatsoever insofar as reproducing the transmitted television image signals on a black-and-white television receiver is concerned. Such phase change or color shift controls as are brought about by the phase control signals, however, are of very significant effect insofar as the color image reproduction is concerned, for the change varies the order of image line recreation and immediataely prevents any so-called color crawl or color flicker existing between the sequence of lines into which the image is traced and recreated.

Referring particularly now to presently existing black-and-white standards, for the purpose of illustrating further this general system, it will be recalled that in the standard black-and-white television methods where the 2:1 interlace is used, the total number of lines in each complete picture is 525, an odd number. Since the picture is repeated thirty times per second, but since sixty fields per second are developed, each picture field includes 262½ lines, of which, for instance, the first field traces the odd lines of the picture and the second field traces the even lines, and so on. According to the system of color television herein proposed, the field and frame frequency remain unchanged from black-and-white standards. Likewise, the field and frame deflection frequencies remain unchanged. Therefore, during each field deflection (a 1/60 second period), a 262½ line picture is developed. These lines, however, divide themselves in such a way that one-third will be recreated in red, one-third in green, and one-third in blue, if the system is of the tricolor variety. During the next field, or the second 1/60 second period, the produced 262½ lines are also again so scanned that one-third appear in red, one-third in green, and one-third in blue, but these comprise, for instance, the even lines of the image raster. If, for instance, in the first scanning of the first field, line 1 appeared in red, line 3 in green, and line 5 in blue, the present invention so functions that during the third field, or after a 1/30 second period later, when the third group of 262½ lines is scanned, there will have been a phase shift in the color in which each line of the image is scanned, so that, for instance, lines 1, 3 and 5, and so forth, of the picture or image raster will appear in a sequence of green, blue and red. As was apparent in the recreation of the second color field, above explained, the even lines were assumed to appear in an order of blue, red and green for lines 2, 4, 6, and so forth. Thus, after the first phase shift between fields 2 and 3 having been effected it is apparent that for the fourth field of the assumed sequence the changed order of line recreation adopted for the odd lines will cause the even lines to be created in such a way that image lines 2, 4, 6, and so forth, will appear in the same sequential order as did the lines of the first field created, except that the color producing the first line of the first field will have been made to produce line 2 of the fourth field and the color for line 3 of field 1 will appear as line 4 of field 4, and the color of line 5 of field 1 will form line 6 of field 4, and the color order for even numbered lines will then repeat.

Following the same pattern, fields 5 and 6 will be recreated in such a way that for field 5 the odd lines will appear such that image raster lines 1, 3, 5, and so forth, are developed in blue, red and green (which was the order of line recreation for the evenly numbered lines of the second field) and the evenly numbered lines of the sixth field will interchange the color order for the odd numbered lines of field 3. The next phase shift will then carry over to the seventh field to duplicate that which appeared in field 1, for instance, with other fields similarly following.

This control of the shift of the color phase at the completion of each frame of the reproduced image raster (or even, as above pointed out, during the course of such reproduction of the color representations of each image point) is under the control of the incoming signal from the transmission point. The signal to accomplish this result and objective must necessarily be of such a character that it functions to maintain precise synchronism between receiver and transmitter in the normal black-and-white television receiver, and, of course, accomplishes this same objective in the color receiver. This control signal in the color receiver also provides an additional function in that it controls, as it were, the color interlace pattern and provides for superimposing that pattern on the normal line interlace pattern of a standard system without in any way impairing the reception of black-and-white television images directly from the color image signals.

Thus, for receiving television signals transmitted according to the proposals of this invention, the receiver may be the standard black-and-white receiver without any modifications whatsoever from that receiver in its now accepted commercial form. The color television signals transmitted to provide color reception on color television receivers utilize only that frequency band now allotted to black-and-white transmissions and can be reproduced on black-and-white receivers in the precise characteristics of the now standard monochrome images, and yet, in addition, where proper choice of receiver components is made, the same signal can be caused to control tricolor television reception.

In the light of the foregoing, it becomes an object of this invention to provide a receiver device for color television wherein high fidelity color may be received by following a line sequential color television operation wherein any two successive fields are line interlaced, as in the present standard 2:1 line interlace pattern, and wherein each succeeding series of fields similarly interlaced shall be interlaced also with respect to color, so that each line of a standard type of image raster shall be traced, in the course of a limited number of field scannings, in each color of an additive multicolor, so that the effects of color fringes, color crawl and color flicker shall be absent.

Still another object of the invention is to provide a system of color television which, when the transmissions are received, shall be capable of causing response of now standard commercially sold black-and-white television receivers, so that black-and-white monochrome television images shall be reproduced thereon in all respects in accordance with present day existing standards and without impairment of quality, brilliance, detail or any other feature characterizing the now accepted methods of reception.

Other objects of the invention are those of providing a system for transmitting color television images wherein there is developed during the course of transmission a controlling signal which shall be effective at points of reception for controlling black-and-white television receivers in such a way that normal operation is continually maintained and which control signal also shall be effective with respect to color television receivers of the line sequential variety in such a way as to provide a color interlace sequence to be overlaid or superimposed in the normal line interlace pattern.

Other objects of the invention are to provide a receiver system for color television wherein a receiver of the normal black-and-white monochrome variety may be converted into a projection type color receiver at a cost substantially like that normally required to convert the black-and-white monochrome into a projection system for black-and-white monochrome pictures.

Other objects of the invention are those of providing a color television system of high fidelity wherein the principles of control and operation are applicable either to the projection type of image receiver or to the direct viewing type of such receiver, and wherein the image brilliance is not unduly affected by reason of addition of the color feature thereto.

Other objects and advantages of the invention will manifest themselves and become apparent to those skilled in the art when the following description is considered in conjunction with the accompanying drawings wherein:

Fig. 1 is a schematic diagrammatic illustration of a field pattern of six successive image fields or rasters traced on a cathode ray viewing tube prior to projection of the resultant image. In this figure the image raster for the independent component colors of the additive tricolor system assumed have been represented as juxtaposed to one another for simplicity of illustration, and likewise for the purpose of illustrating the operation, the return line period for scanning in "snap-back" has been shown as occupying a zero time interval, and likewise the normally suppressed return line has been shown as if actually being present in order to portray more clearly the scanning pattern;

Fig. 2 is a series of wave forms to illustrate the general formation of the line synchronizing impulses and the relationship in time of the line synchronizing impulses to the commencement of the field synchronizing impulses. In these diagrams the presence of video signals intervening between successive line synchronizing signals has not been indicated, but if indicated would be to extend in the direction below the horizontal line connecting successive synchronizing impulses with the horizontal line representing substantially 75% of the amplitude of the signal from its minimum value (for the brightest picture) and the tops of the synchronizing impulses representing 100% signal amplitude with the blanking level represented as being that at which the horizontal lines appear.

Figure 7:
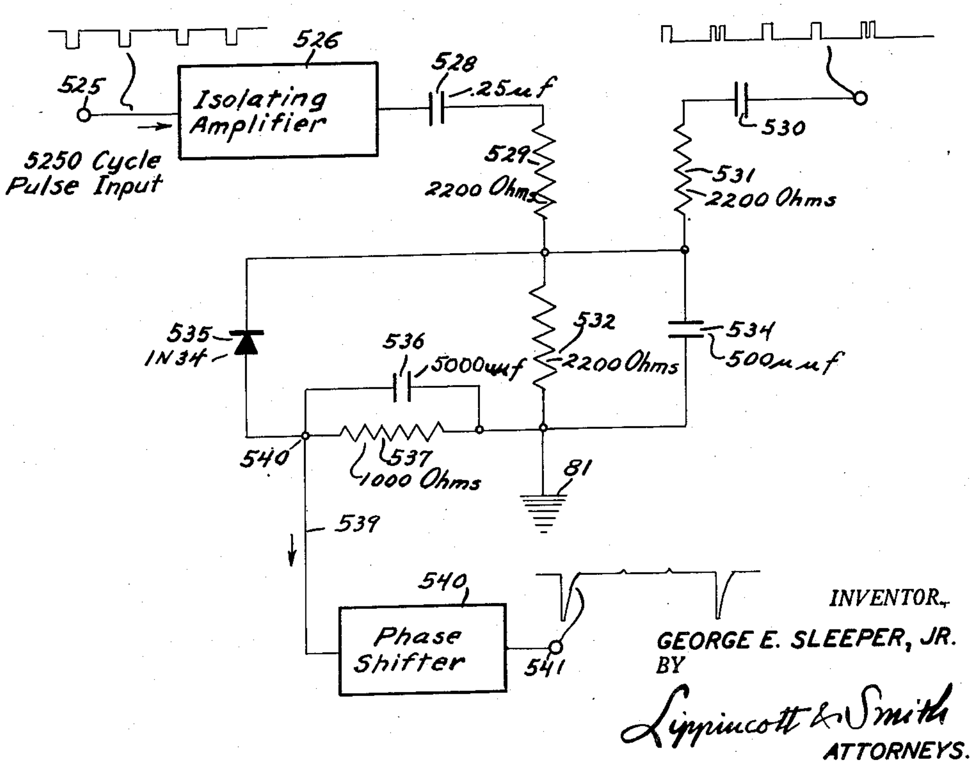
Figure 4:
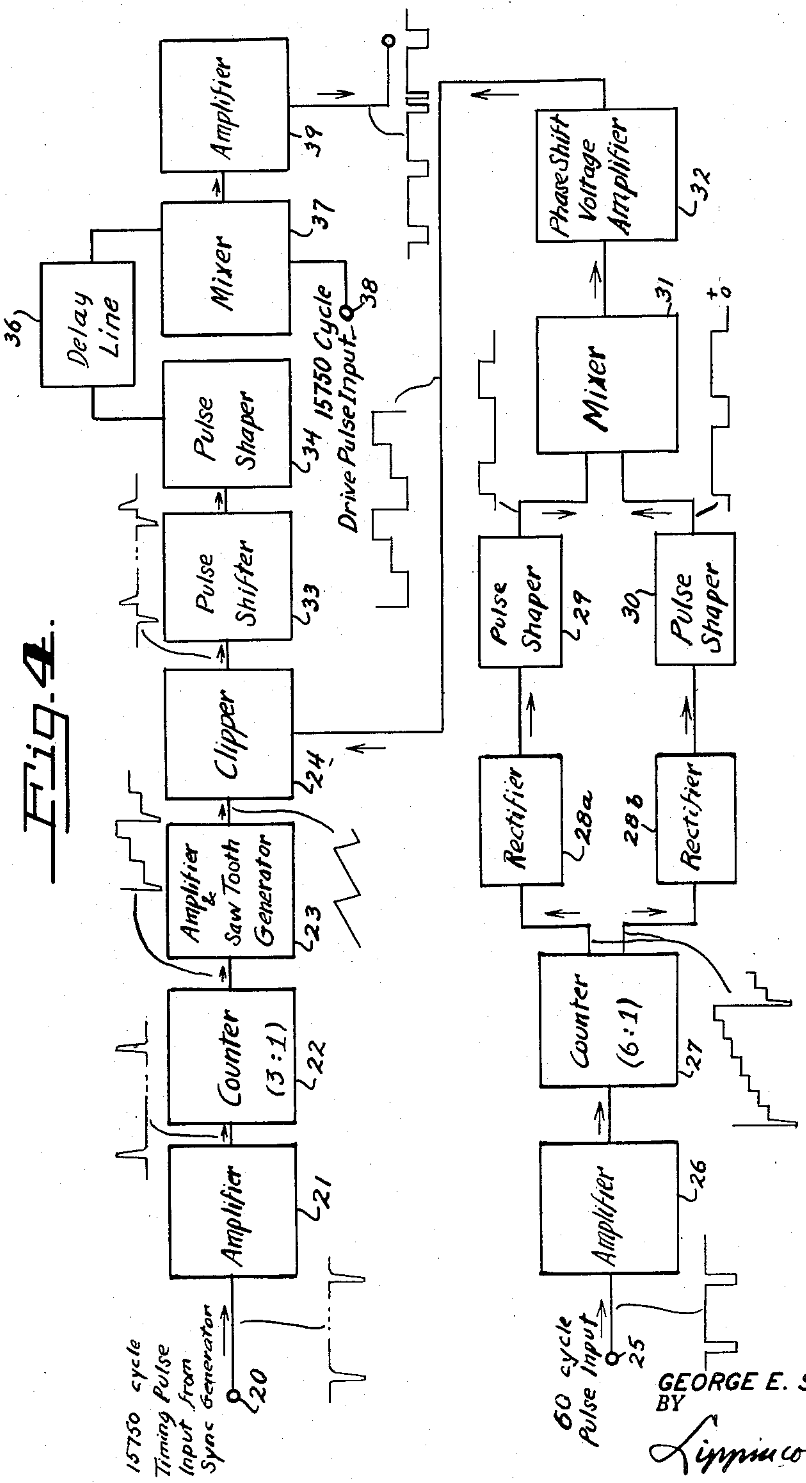
Fig. 4 is a schematic showing of the circuit to develop the color control sync pulses which are effective in a black-and-white receiver as if they were unchanged from normal sync pulses for black-and-white systems and yet serve in the color television receiver to control the color image production.
Figure 6:
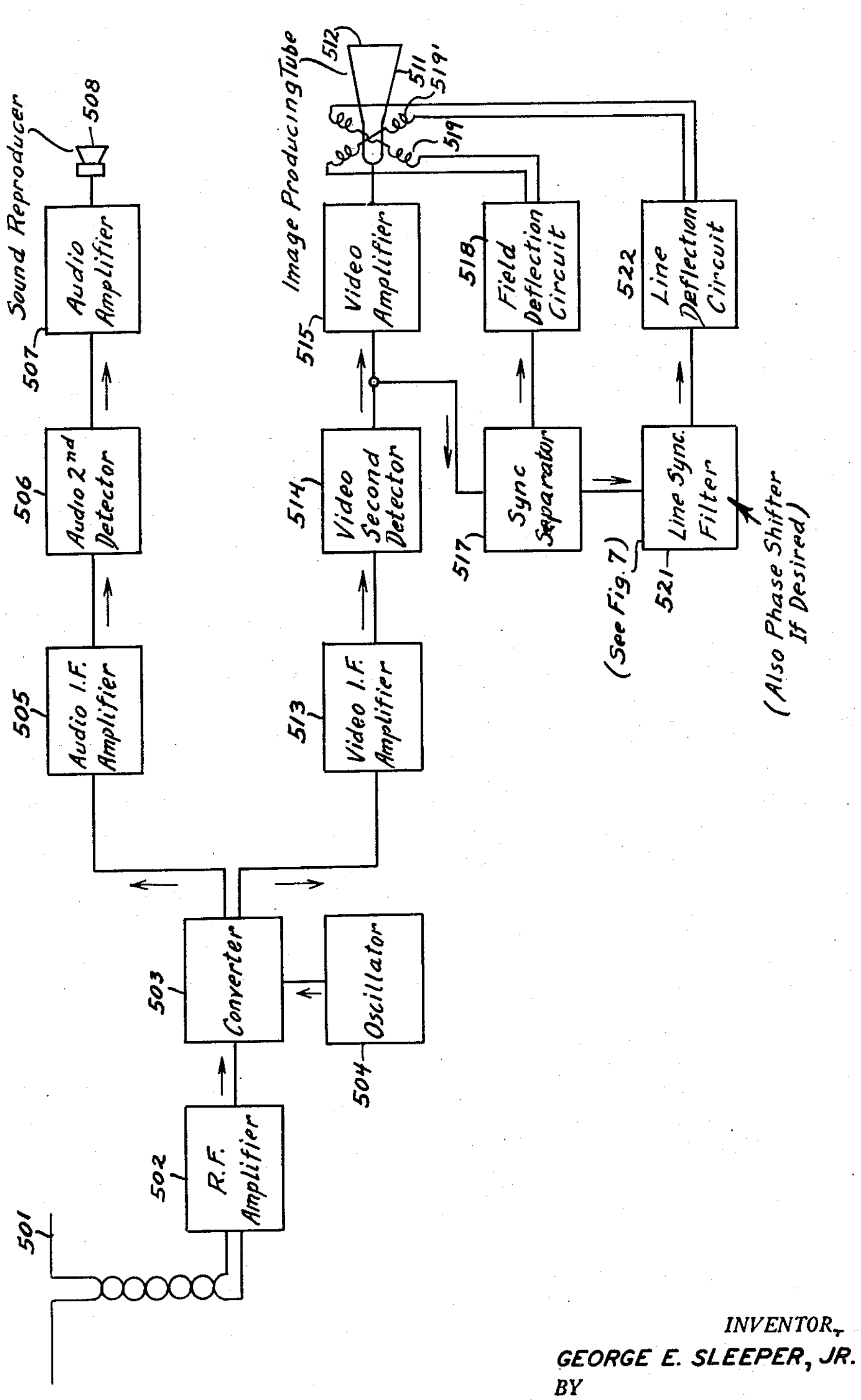

Fig. 5 comprises parts A and B for a circuit diagram of one form of circuit for accomplishing the development of the shifting phase relationship of the line synchronizing impulses with respect to one another for different colors as different fields of the image raster are traced which are diagrammatically represented in Fig. 4;

Fig. 6 is a schematic representation of a television receiver in block diagram form; and Fig. 7 is a circuit diagram of one form of circuit component addition supplied to the receiver for the purpose of segregating the different forms of control impulses from one another and controlling color reception.

Figure 1:
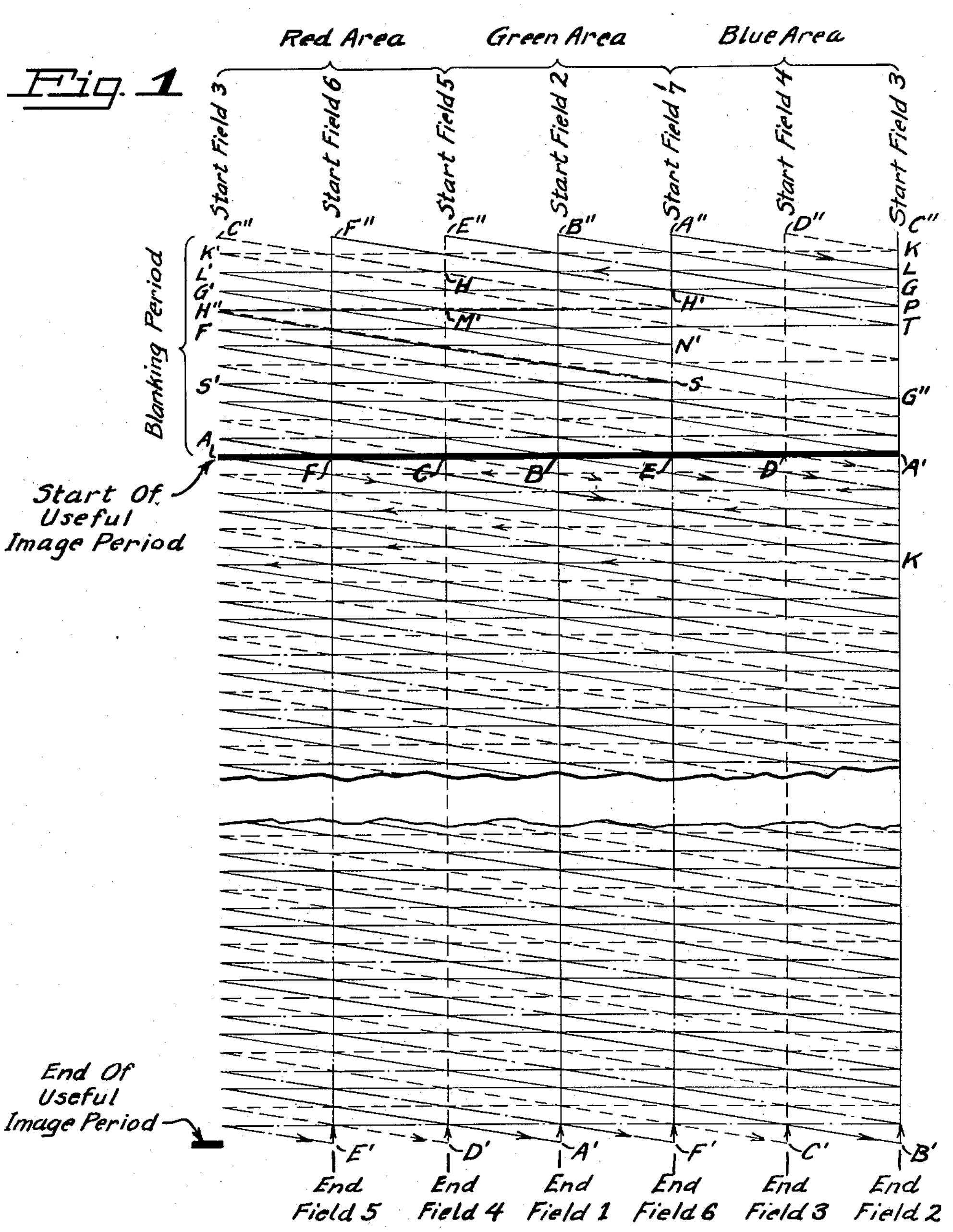

Now, making further reference to the drawings for a further understanding of this invention and first to Fig. 1 thereof, it will be assumed that all of the portion of the figure above the rather heavy line marked "Start of useful image period" occurs during the so-called vertical (field) blanking or snap-back period. Therefore, such portion does not constitute an area of the image or picture raster which is visible to observers. Likewise, in considering Fig. 1, it should be appreciated that the showing is purely for illustrative purposes and therefore the normal aspect ratio of 4:3 has not been maintained. The period of time indicated between the start of the image period at the heavy line and continuing down to the bottom of the schematically represented raster to the edge marked "End of useful image period" is normally the vertical dimension of the selected image raster and therefore is measured as a unit of 3. The line width of the image raster representing the horizontal dimension is one-third longer for each raster than the height, if the 4:3 aspect ratio which has not been standardized is maintained. Accordingly, in considering the showing of Fig. 1, it should be understood that the width of the traced raster as indicated between each of the points A and C, or between points C and E, or between points E and A', shall be considerably expanded and lengthened, and in practice would be four-thirds the length which is represented between the start and end of the useful image period. Likewise, for simplification purposes, the separate rasters for each of the separate component colors of the additive tricolor scanning pattern have been shown juxtaposed. This may or may not be the case in the practical operation. Following the teachings of applicant's presently pending U. S. patent application, Serial Number 747,452, filed May 12, 1947, for "Television System," these separate color rasters can be placed adjacent one another and the images in the different component colors into which the subject is analyzed there will be segregated with respect to the several separate rasters by appropriate optical arrangements described in the last named pending patent application. To illustrate this invention it is believed that the appreciation of the nature of scanning will be simplified initially by taking recourse to the type of illustration of Fig. 1. Likewise, during normal operation, it is desirable that a space of time elapse between the completion of each line of the image in the separate rasters. In the space of time between each line scanning of each color raster the line synchronizing pulse is injected for maintaining synchronism in the scanning operation. However, for simplification, the diagram of Fig. 1 does not take this factor into account in that its purpose is to show the relationship of the scanning operation in the several colors of the selected tricolor. The form of control signal depicted by Fig. 2, however, is that which would normally result to maintain synchronous operation between successively scanned lines.

Now referring more particularly to Fig. 1, the line raster traced for the successive field scanning operations is there depicted in such a way that the solid lines (first starting at point A) represent, for instance, the first, second, seventh and eighth, and so on, fields scanned. The dash lines represent the third, fourth, ninth, tenth, and so forth, fields scanned, and the dash-dot lines represent the fifth, sixth, eleventh, twelfth, and so forth, fields scanned. Due to the fact that 2:1 interlace is provided, it will be seen that the scanning line for each odd numbered field ends at the midpoint of one of the different color areas, whereas the termination of each even line of the scanned rasters ends at the right-hand edge of one of the separate color areas. This, it will be appreciated, is so that the normal form of scanning for black-and-white shall be followed insofar as the actual line traces are concerned. For the color interlace which, according to this invention, is to be superimposed upon the normal 2:1 line interlace, the color sequence which will be followed and its operation, will be appreciated particularly from the upper portion of the showing of Fig. 1 and the waveforms diagrammed for Fig. 2 when considered in conjunction with the particular form of circuit which is presented to show one form which the system may assume.

Assuming, for instance, that three color fields are to be interlaced and that the line interlace for each scanned frame is of the 2:1 variety, with 525 lines per image raster, it can be appreciated that in one form of scanning pattern the last line of field 6 may end at the point F' shown at the lower edge of the raster diagram in Fig. 1. With the line raster depicted by Fig. 1 being such that return lines of the raster or picture are indicated as if actually present (for clarification purposes in this description and purely for illustrative purposes), it is assumed for explanatory purposes that zero time elapses between the arrival of the scanning beam at the lowermost edge of the raster and its return to the uppermost edge for each scanned field, or the time of its arrival at the right-hand end of each line and its return to the left-hand edge to commence the next line scanning, it will be seen that field 7 (which would be identical to Fig. 1 if the sequence is to be repeated following each six scanned fields) will commence at the point A''. With no special control upon the line frequency oscillator to control the line deflection, the traced path of the next succeeding line might be assumed to be in the blue area (the last previous trace having been assumed to end in a "green" area) between the points A'' and L, after which the scanning beam of the image producing cathode ray tube would snap back to the point L' to start the next succeeding scanning line. Where it is desired that color interlace be followed and where the form of color interlace control signal depicted in diagrammatic form, for instance, by Fig. 2 hereof, is utilized the scanning of the next succeeding line will commence at the point L', continue through the point M' and to the point N', which is at the commencement of the entry of the scanning spot into the "blue" area. At this time, however, a shift in the normal scanning line sequence can be introduced through a special control pulse whereby the scanning line trace then, instead of continuing into the blue area, will snap back to the point X, for instance, at the left edge of the red and commence to follow a normal line deflection through to the end of the field. As a result of this, the line trace commencing at the point X carries through in sequence the red, the green and the blue areas between points X and A', abruptly to revert to point A at the left edge of the picture, whereupon the sequence is carried through the line AK and so on.

Figure 2:
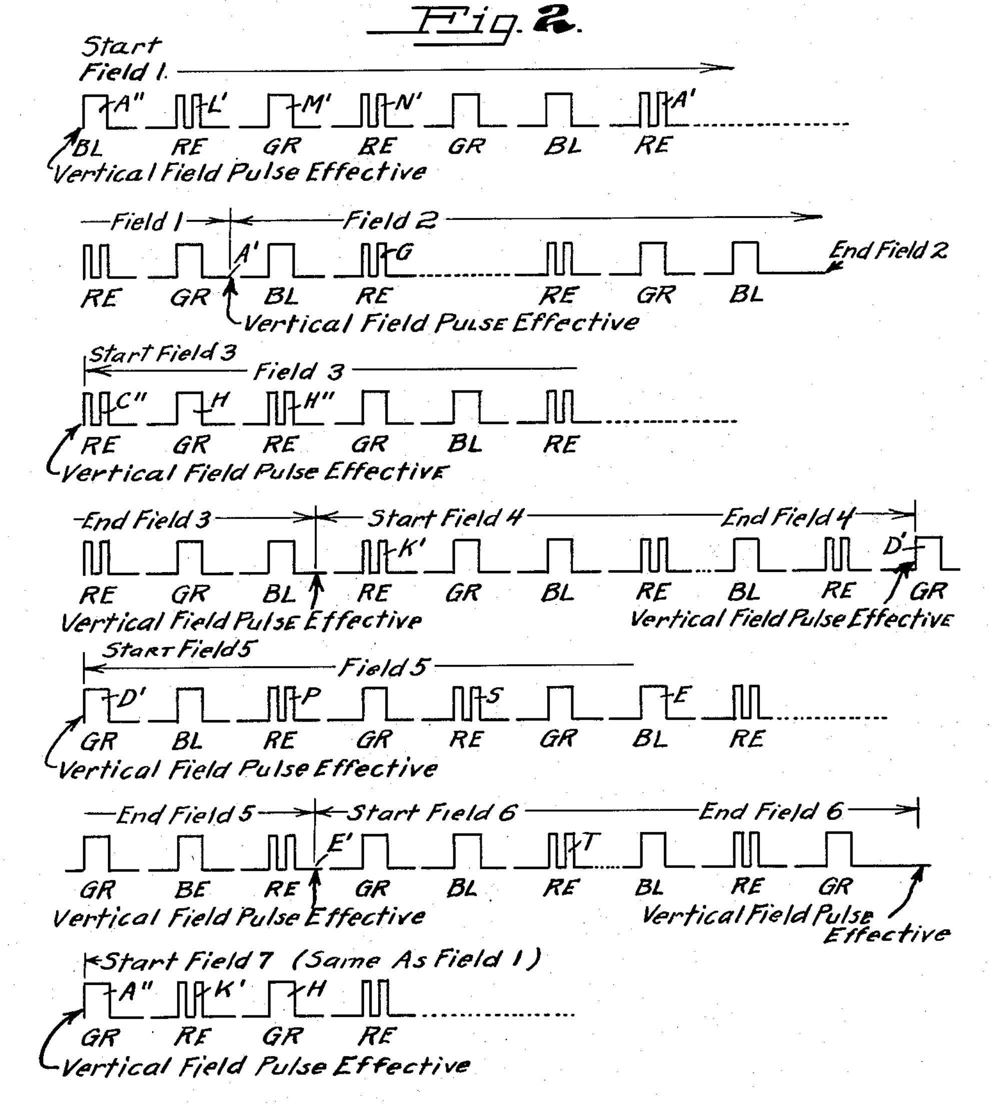

Reverting now for a moment to the showing of Fig. 2, and first to the upper line of the curves there depicted for field 1, the pulse A'' is that which is effective at the point A'' in Fig. 1 and therefore the pulse and the point designations have herein carried identical letterings. It was explained that as the line deflection carried through from the point A'' to the point L and the scanning action then again snapped back to start at point L' and hence the special designation L' within the slotted pulse marked RE (RE being to indicate red, for instance) where each so-called "red pulse" will be slotted for identification, the scanning operation continues, as herein indicated, and as the scanning beam reaches the point M' it will be controlled in its next deflection for the next color field under the influence of the so-called "green pulse" marked GR in field 1 of Fig. 2, with the indication M' having been shown within the pulse to indicate its time of effectiveness. It was explained above that a point N' the beam snapped back to the point X whereat the next scanning was traced in red, and hence in the line of field 1 for Fig. 2 the red pulse RE is shown also as effective at the point N'. Continuing through beyond this point, the line deflection is controlled successively by the green and the blue pulses GR and BL until the deflection reaches the point A', whereat another red pulse takes over and the scanning commences at the point A indicated at Fig. 1.

In the showing of Fig. 2 where the several pulses are represented, it is of course to be appreciated that the scale from left to right represents "time" and the showing is actually of a most schematic nature, for in practice the time of duration of the line pulses such as RE, GR, BL, and so on, is actually $0.08 \pm 0.01H$, where H is the time separation occurring between successive synchronizing pulses for each line. However, the showing in the form presented is believed to be completely clear for illustrative purposes even though the video modulation showing is omitted and the breaks in the time indication show that the full time period (relative to pulse duration) cannot readily be depicted.

Reverting now again to Fig. 1, it will be seen if the solid line trace commencing at point A is followed through to the bottom of the image raster that it will reach the lowest or bottommost point of scanning on the scanned raster area (coinciding with the time of occurrence of the vertical field deflection pulse occurring at the moment assumed 60 cycle rate) at the time the scanning beam reaches the point A′. At this time, still assuming that no time elapses in the beam motion from the bottom of the raster to the top, snap-back action occurs and the first line scanning of the second field commences as a result of the preceding line control pulse effective at the time the beam entered the color area within which the point A′ is located, until the scanning beam enters the next succeeding color field. In Fig. 2 this condition is represented as occurring at the point A′ in the second line depicting the termination of the field 1 scanning and the commencement of field 2 scanning.

With this condition present it will be seen that at point B′′ the scanning of the second field is started, and as the scanning beam moves along the line from B′′ through to G it will be controlled by the next succeeding line pulse (assumed to be a blue pulse BL) as it enters a blue area designated. By the time the beam has reached the point G the next succeeding so-called red synchronizing pulse (the slotted pulse RE) has arrived and the beam deflection then takes place along the line commencing at G′ and carries through to G′′ whereat it reverts again to the left-hand edge of the raster and then moves to the right to enter the useful portion of the scanning at the point B, which is assumed to be midway within the green area. The scanning operation then continues without alteration of the cycle until the completion of the last line of the second field, whereat the scanning beam has reached the point B′, marked at the lower edge of Fig. 1 as "End field 2." This is depicted also by a similar legend on the second line of pulses shown in Fig. 2. It coincides in time relationship with the initiation of the vertical field pulse, which becomes effective in field 3 as also shown in Fig. 2 at a time coinciding with that at which the so-called "red" line synchronizing pulse RE influences the beam, which it will be seen by reverting to Fig. 1, is at the point C′′ at the upper left-hand edge of the raster area.

Diverting for a moment to the upper portion of the schematic representation of the raster in Fig. 1, it will be appreciated that the number of lines there designated as occurring above the start of the useful image period shown by the solid line are relatively few in number. In practice, however, the number of lines so developed is reasonably material, and the present existing standards point out that this blanking period shall be for a duration of 0.05V with a permissible variation of +0.03V, where V represents the vertical deflection time period, and therefore it can be assumed that if the vertical blanking period is as much as 0.08V, this can correspond to a period of the order of twenty scanning lines, and therefore the more or less complex scanning pattern, and somewhat of a duplication of the scanning lines present in the portion of the raster can be of various forms without impairing in any way the resultant image viewed.

Turning now again to the field scanning represented as commencing at the point C′′, it will be seen that the first line synchronizing pulse effective within the third field is that shown as the so-called red pulse RE within the third field. The line scanning is represented in Fig. 1 as a dash line continuing through point H as the beam enters the so-called green field and is influenced by the line synchronizing pulse for green until it reaches the point H′, whereat instead of being subjected to the control of a pulse which would continue the deflection into the blue field, it is instead subjected to the control of a so-called red line synchronizing pulse RE and snaps back to point H′′, whereat the next line scanning occurs. At this point, as is diagrammed in the showing of Fig. 1, the scanning operation continues without interruption and without alteration through to the bottom of the image raster with the first line of useful scanning commencing at point C at the upper left-hand edge of the assumed green image area. This is line 1 of the third field. The scanning lines then occur and repeat in the sequence of green, blue, red, and so on, until the scanning beam reaches the lowermost edge of the image raster at point C′, which in Fig. 1 is marked "End of field 3." This likewise is depicted in the showing of Fig. 2 by the diagrammed indication of the time at which the vertical field pulse becomes effective intermediate fields 3 and 4. With zero time assumed as snap-back from bottom to the top of the raster allotted, it can be seen that the scanning beam reaches the top at point D′′ to commence the scanning of field 4. As the scanning beam reaches the right edge of the raster at point K for the commencement of the scanning of field 4, a so-called red synchronizing pulse RE controls the deflection according to the same pattern as heretofore established and becomes effective at point K′.

Following the designations of the raster trace of Fig. 1, it will be seen that the scanning beam in field 4 enters the useful scanning area midway within the blue scanning area at point D. The scanning operation is continued through to the bottom of the useful image period, whereat it will be seen that the fourth field ends at point D′ at the right edge of the red scanned area, at which time the scanning beam, insofar as its line deflection is concerned, is controlled under the influence of a so-called green synchronizing impulse GR, also identified for the depicted fields 4 and 5 of Fig. 2 as the pulse D′.

The beam then returns to the top of the field and commences a scanning along the line between E′′ and P, with a normal type of synchronizing pulse controlling as the scanning operation enters into the blue area and a red synchronizing pulse RE effective at point P to deflect the beam back until it reaches point H′′, whereat the scanning may be assumed to be along exactly the same trace for a part thereof as that followed by the scanning beam in its motion in the third field from point H′′ to the right of the raster. However, in this instance, in order to shift the color field, the scanning operation does not continue completely to the right of the scanning area, but at point S, which corresponds to that point at which the beam would enter the blue area, a so-called red synchronizing pulse RE is developed and the beam at point S reverts to point S′ to commence a scanning again of the red area.

From that point on, the beam is subjected to the influence of the green synchronizing control and the blue synchronizing control as it enters into the blue field at point E, there to scan a complete line (line 1 of the fifth field) of a blue image. From this point on to the bottom of the field the scanning is without change and the beam reaches the bottom of the fifth field at the portion marked "End field 5," which is also depicted by the point E'.

This point E' is shown represented on the diagram of Fig. 2 also at the point E', which likewise represents that point at which the vertical field pulse becomes effective to take over the control. The scanning beam then snaps back to the top of the raster and from point F'' moves along the path from F'' to T and is effectively controlled by the green, the blue and, at T, by the red synchronizing pulses. Thus, as was the case of the scanning beam entering into the even numbered fields 2 and 4, no change normally occurs in the order at which the red synchronizing pulse appears for any evenly numbered field. However, as the beam motion carries down from the top to the bottom of the scanned image raster, it finally reaches the lowermost edge, marked point F'. Also, the end of field 6, at the time the scanning beam would normally enter the blue area and at the time when the green area scanning has just been completed, is the time when the scanning beam reverts from the bottom edge of the raster to the top and moves between point F' and point A'' to commence the scanning of the seventh picture field, which is a repetition of the first picture field and the operations heretofore described and depicted are repeated.

From the foregoing analysis of the diagrammed raster in Fig. 1 and from the reference also to the several forms traced on Fig. 2, the general method of shifting the phase of the scanning trace from line to line and from color to color has been exemplified. It can be seen that no change whatever occurs insofar as the rate of scanning different image raster lines is concerned, because all scannings occur in a line-for-line manner, and the number of color areas scanned per traversal of the scanning beam from the top to the bottom of the raster area is invariant. In those cases where the scanning commences at the left edge of any color area, for instance, it terminates at a central point in a color area at the bottom of the color raster. Likewise, where the scanning starts at a central point in any one color area at the top of the raster, it terminates at the completion of scanning of a complete color area at the bottom edge of the raster. The vertical deflection rate likewise never departs from that set up as standard for black-and-white operations, and herein assumed to be sixty fields interlaced 2:1 to provide thirty frames per second of 525-line image rasters. It can be seen, however, that the showing of the foregoing scanned pattern has been assumed in such a way that the scanning of the first image field is assumed to be in the order of red, green, blue, red, and so on, for lines 1, 3, 5, 7, and so forth, with the lines for the second field being blue, red, green, blue, for instance, and so on, for lines 2, 4, 6, 8, and so forth. At this point in the scanning the phase relationship of the color scannings shifts to a point where the scanning order for lines 1, 3, 5, 7, and so forth, as the scanning beam enters the "useful image period" changes to a sequence of green, blue, red, green, and so on, for lines 1, 3, 5, 7, and so forth. Then, to complete the second frame, field 4 is so scanned that the even lines commencing with line 2 and those following are produced in the order of scanning red, green, blue, red, and so on. At this time in the operation a further phase shift in the color scanning is effected and the odd lines of the raster, 1, 3, 5, 7, and so forth, are scanned in the color order of blue, red, green, blue, and so on, to be followed by the even lines of field 6 scanned in such a way that lines 2, 4, 6, 8, and so forth, follow the color order green, blue, red, green, and so on. As the scanning then completes the sixth color field and reverts to field 1 (this is equivalent to field 7), the above named assumed color scanning order will be repeated.

In the examples shown by Figs. 1 and 2 to explain this operation, the illustration of the color sequence is representative of one form that the invention may assume, and it will be noted that in each field the selected colors of the tricolor always follow in the proper order from line to line, and considering the colors as a group it will be seen that the order upon which the scanning proceeds is such that color crawl and color flicker are inherently absent in the operation.

Figure 3:
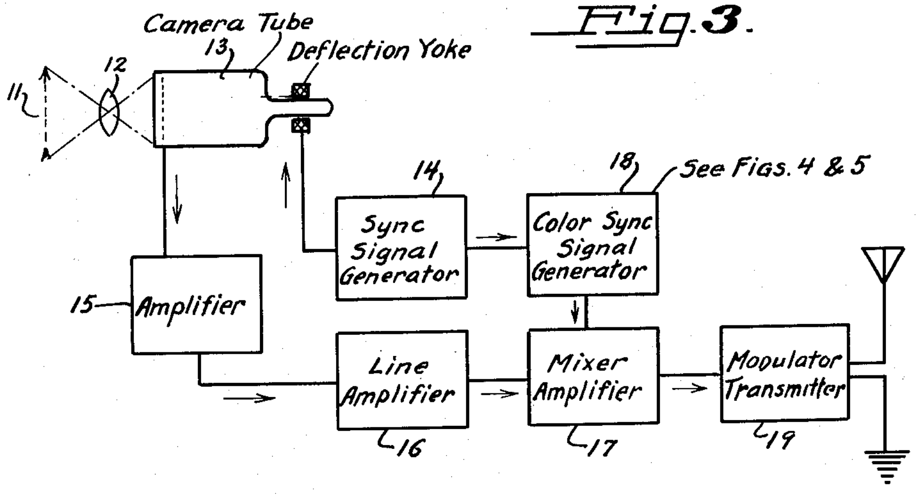
Fig. 3 is a schematic representation of one form of diagram of a television transmitter and its components.

Turning now to Fig. 3, a representation in purely schematic form is there made to show generally the nature of the transmission system. The optical image 11 which is to be televised is projected through any appropriate form of optical system 12 into a camera tube 13 wherein scanning and color analysis of the image is brought about. The showing of Fig. 3 is purely schematic and accordingly for this purpose and purely by way of example, it may be assumed that the optical system and camera tube arrangement are in accordance with the showing of this applicant's copending application for U. S. Letters Patent, Serial No. 747,452, filed May 12, 1947, for an invention entitled "Television System," to which reference has been made above.

The camera equipment depicted by Fig. 3 is of a character very closely related to what is recognized as substantially standard equipment for black-and-white image translation. As was explained in the above named copending application, Serial No. 747,452, the three separate component color optical images are focused side by side in juxtaposed manner and then scanned, in effect, as though they were a single image. It thus is possible to base the operation upon the same vertical or field deflection frequency as has been adopted for black-and-white transmissions and in order that the band width of the resultant transmission shall not be extended beyond that required for black-and-white, the horizontal or line scanning frequency then becomes one-third that which would normally be used for the black-and-white transmission, although with the scanning of each of the three component color image rasters along one line, each in a different color for each horizontal or line scanning deflection, it of course becomes apparent that the number of lines actually scanned is identical with that used for the standard black-and-white operation. While the copending application, Serial No. 747,452, above referred to, suggests one form of optical system and filter combination for directing the separate component color images into the camera tube, it is of course apparent that various modifications of such forms of filter devices may be utilized, and included among these are the now generally known forms of dichroic mirrors which will provide the several desired color separation images.

The analysis of the separate component color images directed into the camera tube 13 is brought about under the influence of a synchronizing signal generator 14, whose output feeds in one direction to control suitable deflection coils (not shown), or plates, where desired, in association with or forming a part of the camera tube. The synchronizing signal generator is of substantially conventional form, although in the illustrated instance the line frequency deflection thereof with the component color images positioned adjacent each other becomes for standard operation a 5,250-cycle deflection control.

As the signals resulting from image translation in the several component colors are developed within the camera tube 13 these are fed to a suitable amplifier 15 of any desired and conventional type, as is well known, for amplifying a relatively wide band of frequencies. The output from the amplifier 15 then customarily feeds through a line amplifier 16 (also a purely conventional form) into a mixing amplifier 17 (also of conventional form). Supplied to the mixer amplifier along with the output from the line amplifier 16 are color sync signals which are generated by the color sync signal generator combination 18, which is more clearly depicted in the showings of Figs. 4 and 5 of this application.

It will be apparent that the accuracy of registration can be determined through the use of an electronic viewfinder embodying a cathode ray image producing tube with the modulation of the image raster being controlled, for instance, by the output of the camera tube amplifier conventionally represented at 13. Viewfinders of the electronic type have been used in connection with cathode ray television camera apparatus, and accordingly the particular viewfinder is not shown in schematic form. However, the viewfinder operates to control line deflection at three times the camera scanning frequency, since it functions in the nature of the normal black-and-white image receiver. Therefore, the alignment of the resultant image is a true and absolute measurement of the registration that shall be obtainable in the reproduction of the color image at the receiving point, such as that represented in Fig. 6, because each of the produced line sync pulses serves always to control the beam deflection for one line of the image and thus serves immediately to prevent any nonlinearity by initiating the commencement of each scanning line at absolutely uniformly spaced time intervals. This type of scanning control signal is present in this system at all times, although the actual form of the signal used to regulate the color image reproduction is such that certain of the control pulses are notched, as indicated by Fig. 7, for instance. There is a uniformity of spacing between successive pulses. This spacing rigorously maintained at all times and found in the type of scanning operation wherein it is assumed that three image rasters are juxtaposed to one another. The normal type of line scanning impulse occurs between the adjacent edges of the contiguously positioned raster areas.

The color sync signal generator 18 is influenced and controlled in its operation by the sync signal generator 14 in a manner which will also be understood and explained particularly in connection with the showing of Figs. 4 and 5 of this application. Therefore, suffice it to say at the moment, that the output from the color sync signal generator 18 comprises the signal pulses for maintaining line (usually horizontal) synchronization and field and/or frame (usually vertical) deflection of the scanning beam in the image reproducing tube of the receiver. The general character of the line or horizontal synchronizing impulses has been set forth and explained in connection with the descriptive showing of Fig. 2 of the drawings, and also will be found referred to in the description of Figs. 4 and 5. Therefore, no special reference to this portion of the apparatus need be made in connection with this particular portion of the description.

The output from the mixer amplifier which now contains the information concerning the video signal analyzed into its several component colors and controlled as to recurrence under the influence of the sync signal generator and the color sync signal generator is supplied to a modulator transmitter 19 of well-known form, so that detailed illustration is unnecessary. The resultant modulated transmitter carrier signal is then supplied through any known form of utilization signal channel, such as a radio link, through a transmitting antenna or a wire line connection through a coaxial cable. From either of these units, distribution to points of relaying or direct reception may be maintained.

For reasons of simplicity and because the audio additions to the transmitter circuit form no particular part per se of this invention, the showing of Fig. 3 eliminates any reference to the sound or audio signal channel. In this respect, however, it is to be understood that the sound signals may be added to follow a pattern corresponding exactly to the normally adopted methods now practiced for black-and-white transmissions and comprise frequency modulation (FM) of an audio carrier spaced at a fixed separation (now 4.5 megacycles) from the video carrier.

For a further description of the generating unit depicted in block form at 18 of Fig. 3 by which the special form of line deflection and color sequence control signal is developed, reference may now be made to Fig. 4 of the drawings. Fig. 4 likewise is a purely schematic and conventional showing merely to indicate the general nature of the system under consideration. Details of one practical form of circuit embodying the teachings schematically set forth by Fig. 4 are embodied in Fig. 5, and reference to that figure will be made at a later point in this description.

To practice the invention herein to be described, the timing pulses from the synchronizing signal generator, such as the generator 14 of Fig. 3, may be applied at the input terminal 20, and as such are signal pulses of the general form shown by the wave diagrammed adjacent the input terminal. This incoming pulse signal is then amplified through any suitable form of amplifier such as that shown at 21 to develop the waveform represented at the output of this amplifier unit. These signals are also pulses of amplified form, but corresponding generally to those applied at the input terminal 20. The polarity of such pulses, however, is in the opposite direction, and in the direction of increasing signal in the preferred form. Such signal pulses are then supplied to a counter circuit diagrammed at 22, wherein a frequency reduction of the order of 3:1 occurs, with the result that the stepped waveform shown at the output of the counter unit 22 is developed. The counter may be of various forms, such as has been shown by Fig. 5, but various modifications of such counter may include certain of the various forms represented in the chapter entitled "Counting" by R. B.

Woodbury and J. V. Holdam, commencing at page 602 of the book entitled "Waveforms" by Chance, Hughes, MacNichol, Sayre and Williams, and published by McGraw-Hill Book Co., Inc., New York, 1949, and constituting volume 19 of the so-called "Radiation Laboratory Series."

The output from the counter circuits which is of a waveform very conventionally represented on the diagram, is then fed to an amplifier and sawtooth generator, and is used to control a discharge tube for the development of a sawtooth wave of the general form indicated across a suitable storage element such as a condenser. The output from the amplifier and sawtooth generator 23, being of sawtooth waveform, is then fed to a clipper unit 24 for the obtainment therein of control pulses shifting from time to time in phase, as will later be explained.

The other portion of the color sync signal generator 18 comprises a terminal input source for supplying 60-cycle pulse input at the terminal point 25. The pulses occurring at 60 cycles correspond to pulses at the frequency at which the various image rasters or fields are repeated. By the black-and-white standards now in effect for television operations, sixty fields of each scanned image are repeated each second, which accounts for the assumed 60-cycle pulse input fed at the terminal point 25 to the amplifier 26. The general shape of the input and output waveforms to and from the amplifier 26 are represented conventionally by Fig. 4. The amplified pulse output at 60 cycles is then supplied to a counter circuit 26, preferably of the same general form as that used for the counter 22 above described, except for the fact that the counter 27 is arranged to count in the order of 6:1, with a result that the output waves repeat at a 10-cycle repetition rate and may be of the general waveform represented at the counter output. The 10-cycle repetition rate results in accordance with this invention and with the assumed standards utilized because the color frames of the picture repeat at the assumed 10-cycle rate in that the same line of each image raster or field is scanned in the same color for a 525-line image representation only at a 10-cycle rate (although 525 complete lines are scanned for each two vertical deflections and in the $\frac{1}{30}$ second period) as compared to the 30-cycle rate for the repetition of each line of the image raster in the 525-line picture for black and white.

Various utilization circuits for controlling the operation of the clipper unit 24 may be provided to receive the output 10-cycle wave from the counter 27. Such circuits may comprise, illustratively, the rectifiers 28a and 28b, which serve generally to smooth and reshape the counter output signal. These rectifiers are in separate output channels from the counter 27. They may be omitted, where desired, without impairing operation.

In one channel the rectifier 28a supplies its output signal to a pulse shaper 29, which reshapes the 10-cycle pulse to a form generally like that diagrammed, and then feeds its output into a mixer circuit conventionally represented at 31. The other channel feeds through the rectifier 28b and into a second pulse shaper 30, whose output wave generally resembles that shown intermediate the pulse shaper 30 and the mixer 31.

It thus is seen that the output from each of the pulse shapers 29 and 30 is supplied to the mixer unit 31 and that for purposes of illustration it may be assumed that the input signal to the mixer 31 derived from the pulse shaper 29 has its peak portions continue for one-half the time represented as intervening between successive peaks. The output from the pulse shaper 30, which is fed into the mixer, preferably is of a reverse character and duration so that the signal pulse form extends in a positive direction for a period of time twice that of the time separating successive pulses. Also, the amplitude of the pulses from the pulse shaper unit 30 is generally twice that of the signal output from the pulse shaper 29, although this amplitude relationship is not critical. The signals are fed into the mixer, however, to be combined one with the other in such a way that a pulse waveform generally resembling that appearing at the output of the phase shift voltage amplifier 32 results. The pulse shift voltage amplifier is generally in the form of a thermionic tube arranged to receive the mixer output and to utilize that output to control the bias supplied upon the clipper 24.

With the bias level to the clipper varied under the control of the waveform shown in the connecting line between the phase shift voltage amplifier 32 and the clipper unit it will be appreciated that the clipper bias varies at three different levels corresponding to the steps in the there-indicated wave, so that with each separate step in the wave occupying a time duration of $\frac{1}{30}$ second (for the assumed standards and because the complete wave represents a $\frac{1}{10}$ second period, as a result of the counter unit 27 counting down in the order of 6:1), it becomes apparent that the clipping level at which the sawtooth input to the clipper 24 is clipped varies correspondingly. Thus the position along the slope of the more slowly changing pulse formation is modified at each succeeding $\frac{1}{30}$ second time interval. The output from the clipper 24 thus is generally a waveform of substantially squared-off form, which can be differentiated to provide pulses appearing somewhat in the nature of those shown intermediate the clipper 24 and the phase shifter 33. The phase shifter responds to the pulses and provides a control of the pulse shaper 34.

There is also applied to the pulse shaper 34 a signal input at the terminal point 35 again corresponding to the line scanning frequency or a pulse input occurring in this example at a rate of 15,750 pulses per second. With this happening, it can be seen that the pulses separated one from the other as supplied to the phase shifter 35 are now controlled in such a way that certain pulses are positioned or forced outwardly from the others in such a way as to produce certain small peaks, as indicated. These peaks will then be used to control the development of the type of sync pulse used to control the deflection of the scanning beam in one of the selected component colors of the assumed tricolor scanning pattern.

A delay line 36 is arranged to receive the combined pulses and to control the phase thereof fed into a mixer circuit 37, to which is also supplied at the input terminal 38 a similar line frequency signal pulse input, likewise occurring at the 15,750-cycle rate. These pulses are then mixed with the output pulse from the delay line and appear generally in the form shown adjacent the output amplifier 39, which is the amplifier through which the signal of slotted and normal undistorted line frequency pulse formation is fed to the mixer amplifier such as 17 of Fig. 3. This signal output then serves to control the reproduction of the various color images at signal receiving points.

Figure 5A:
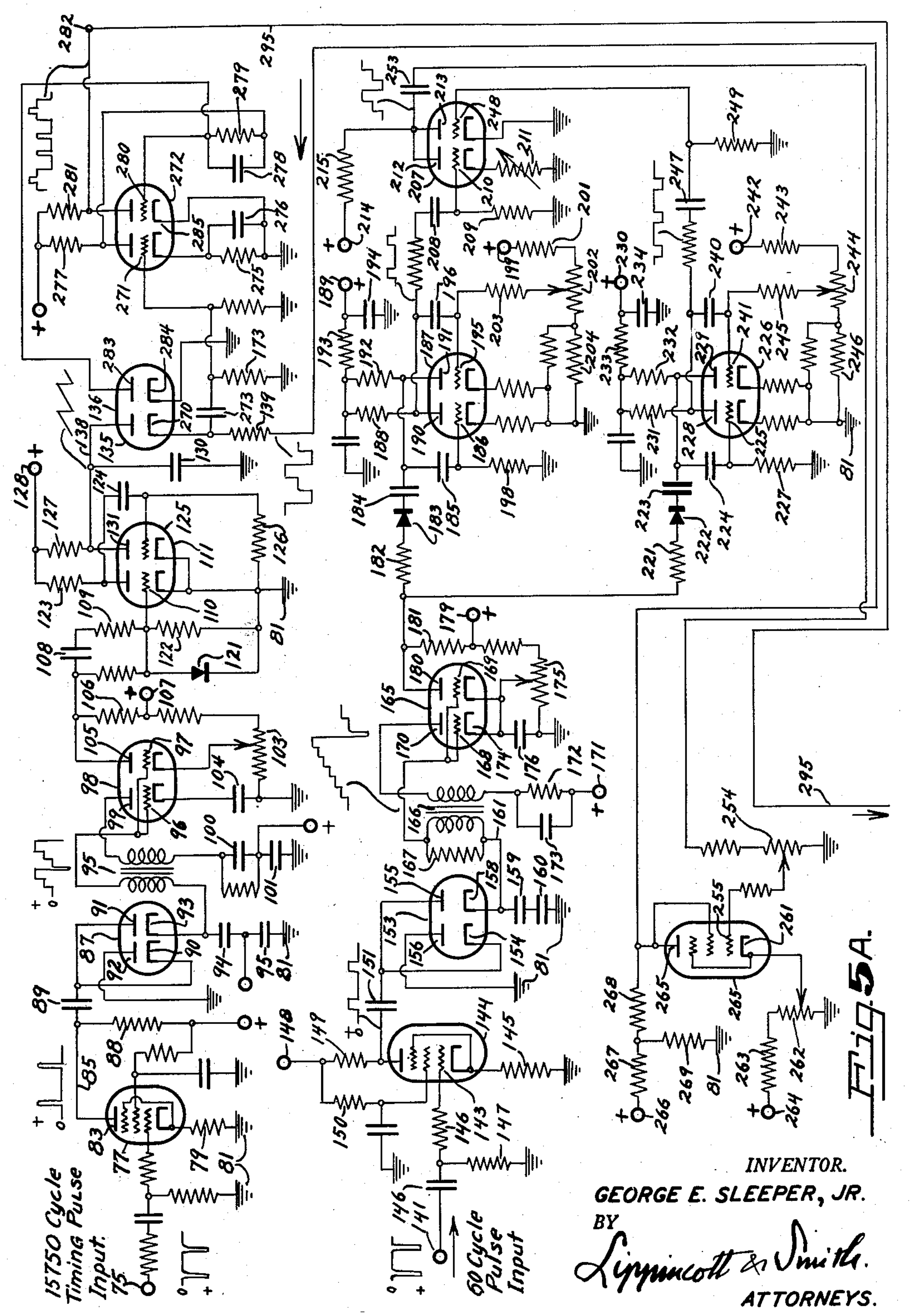
Figure 5B:
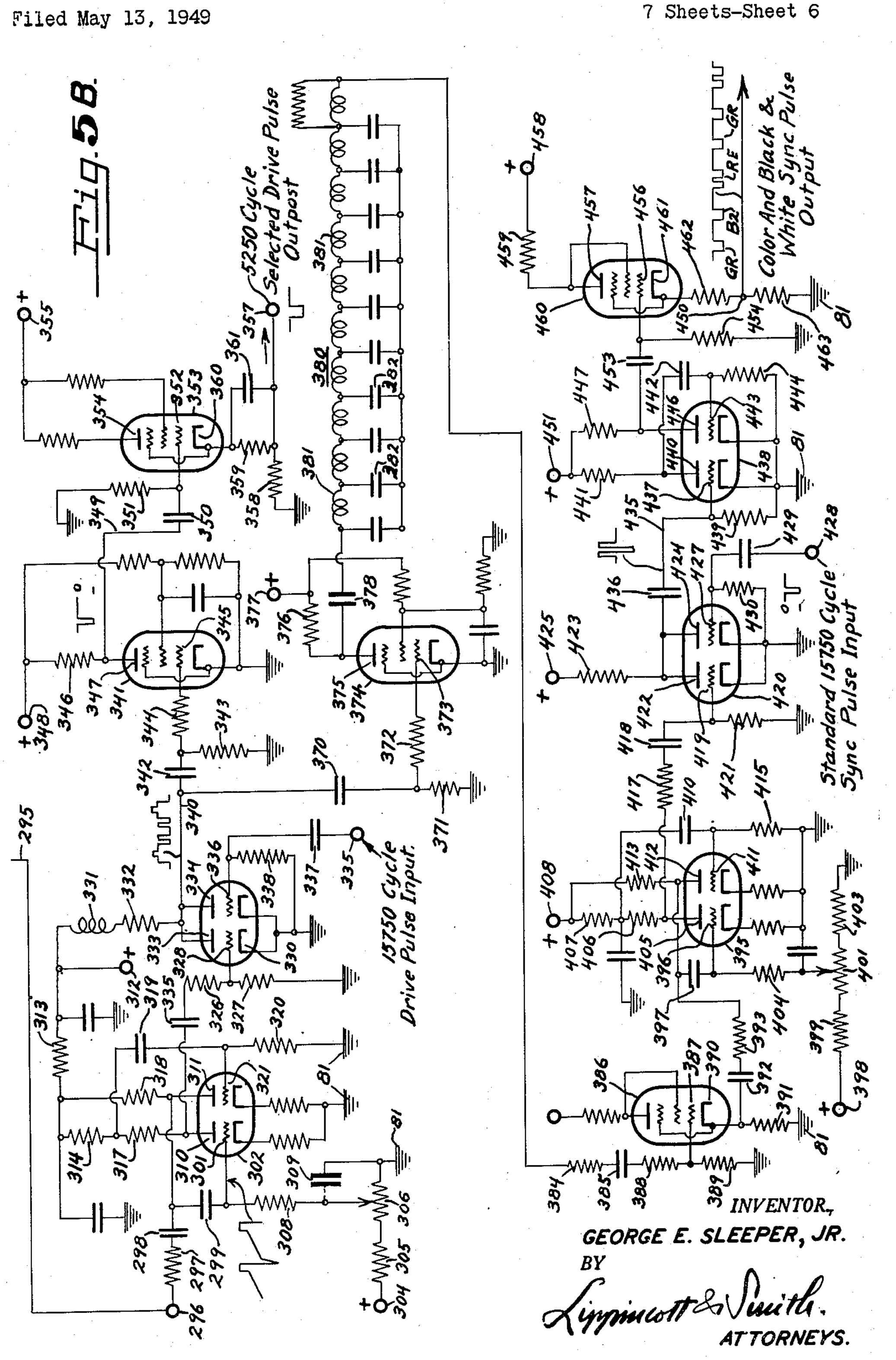

Accordingly, for a further understanding of the invention, and in order to consider one particular form of circuit which is found to function satisfactorily, reference may be made to the circuit formation diagrammed by Figs. 5*a* and 5*b*.

The specific arrangement (herein a purely illustrative circuit diagram) to provide the color phase control pulses intermingled with the normal type of black-and-white control pulses, and further, with the color phase control pulse shifted according to a pre-established sequence of shift, is represented in one suitable form by the diagram of Fig. 5, of which parts A and B together represent the complete circuit. In this arrangement, the timing pulse input is assumed, for purposes of illustration, as occurring at the line frequency of 15,750 pulses per second for a 30-frame 525-line picture. The 15,750 cycle pulses are applied at the input terminal 75 to be fed to the input circuit of the amplifier tube 77. In this arrangement the signals are applied upon the grid electrode of this tube usually in negative polarity and, for instance, in an amplitude of the order of 45 volts peak-to-peak. The tube 77, while capable of being constituted in various type forms, is usually in the form of a so-called 6AC7 type. It is provided with a cathode resistor 79 connecting to ground at 81, and thus in the output available at the tube plate 83 there is some slight degeneration with some reshaping of the pulse. The pulse appears in the output of tube 77 in a positive sense, as contrasted with the negative impressed pulse at the terminal 75.

The general wave form of this pulse is that shown immediately above the conductor 85 connecting the output of the tube 77 to the counter circuit formed to include the double diode tube 87. The output from the amplifier 77 is fed across the output or load resistance 88 and through the capacity 89 into the cathode 90 of one-half of the diode and into the plate or anode 91 of the other half of the diode. The second anode element 92 of the diode 87 is preferably grounded and the second cathode 93 connects through the usual serially-connected storage condensers 94 and 95 connected between the tube cathode and ground at 81. In this arrangement, the condenser 94 is small compared to the condenser 95 and condenser 95 thus becomes controlling, as is normal in this type of counter circuit.

The counter diode 87 functions to supply the pulses to the condensers to count down by an order of 3:1, for instance, so that the waveform available across the condenser, for instance, at the cathode 93 of the diode 87, is of general stepped formation, as indicated, and the pulses occur with a 3:1 reduction over those impressed at the input terminal 75. These pulses are then fed to any suitable form of amplifying tube which will take the condenser output and discharge the condenser, and then to a tube circuit in which the pulses may be reshaped slightly. The depicted connection here shown is that of a transformer 95 having one terminal of the primary connected across the condenser combination of the counter circuit by connection to the cathode 93 of the diode 87. The other terminal of the transformer is connected to each grid of elements 93 and 97 of the tube 98. The first half of the tube feeds back to the transformer by way of the secondary winding connected at one end to the tube plate or anode element 99 and at the other end through a pair of condenser elements 100 and 101 serially connected and of which one at least may be shunted by a resistor connected to ground at 81. Bias for the tube is supplied by way of cathode biasing resistor 103, which is variable in nature and which resistor is shunted between usual by-pass condenser 104. It will be noted that the cathodes of tube 98 receive positive bias (as indicated) and thus when the voltage at the condenser 95 (the larger of condensers 94 and 95 so that it is the main condenser effective) becomes high enough (that is when charged due to impressed pulses) to overcome the bias on the cathode of tube 98 the tube draws current and the condenser discharges. Output from the tube which provides an amplified wave is derived at the anode terminal 105 across the load resistor 106 having a positive operating voltage supplied, for instance, at terminal 107. This source is the same source that supplies the cathode bias. This output voltage constituting a considerably amplified form of the counted down wave at the output of the counter formed from diode 87 and the storage means, is fed through the coupling condenser 108 and the resistor 109 upon the grid electrode 110 of a double triode tube 111.

Also connected across this input circuit of the tube 111 for purposes of wave smoothing and the like, but which may be eliminated where desired, is a rectifier element 121 connected in shunt to the grid resistor 122. The rectifier element 121 may, if desired, be in the form of the now rather extensively used cartridge forms of germanium semi-conductor rectifiers, one type of which is that commonly known as the 1N34. The tube 111 operates in such a way that the impressed wave upon the grid or control electrode 110 thereof is amplified in the first half of the tube and the output from this half is then fed across the load resistor 123, through the grid condenser 124 and on to the grid electrode 125 of the second half of the tube. In this arrangement the grid leak resistor 126 is of relatively high value and the tube is operated in such a way the second half of the tube is normally biased to cutoff by reason of the charge acquired by the condenser 124. The polarity of the signal fed from the first half of the tube on to the grid or control electrode 125 is positive and therefore overcomes the normal cutoff bias applied through the condenser 124 as a result of grid current having been drawn through the tube at times when the positive control pulse is applied thereto. Therefore, during the period when the pulse is applied, it is apparent that a relatively high surge of current passes through the second half of the tube and is available across the tube output or load resistor 127. Both halves of the tube 111 are supplied with positive operating voltage from a source having its positive terminal connected at the point 128. This same source of voltage also serves as the charging source for charging a sawtooth condenser 130 which connects between the plate or anode 131 of the second half of the tube 111 and ground. Thus, during the periods when the second (right-hand as shown) half of the tube 111 is cut off, the condenser 130 is charged from the source connected to point 128 with a charge occurring through the resistor 127, which is of large size so that the condenser acquires its charge in a substantially linear fashion. The voltage appearing across the condenser 130 is that which is generally shown immediately adjacent the conductor connecting the plate or anode 131 of the right-hand half of tube 111 to the plate or anode 135 of a clipper diode 136 having its output derived and obtained across the cathode resistor 137 and its bias of corresponding level determined in accordance with the signal output derived from a circuit later to be described, which terminates in what will be termed a first shift voltage amplifier whose control becomes effective through the conductor 138 upon the diode 136, when acting through resistor 139 and in accordance with the current flowing in the first shift voltage amplifier later to be described.

With the right-hand half of tube 111 drawing current at certain time periods determined and controlled in accordance with the stepped-down counter circuit associated with the tube 87, it is to be seen that with the assumed pulse frequency the condenser 130 will be discharged 5,250 times each second, with the discharge occurring through the right-hand half of the tube 111. This will result in the development of a sawtooth wave formation of a frequency of 5,250 cycles, which is applied to the clipping diode 136 at the plate electrode 135 thereof.

It was suggested in the portion of the foregoing description concerning the manner of obtaining phase shift that the produced change in color in which the scanning of alternate fields is initiated occurred following the termination of each successively scanned image frame. Thus, with existing standards, and with the assumption that this disclosure is for illustrative purposes, as based upon presently existing black-and-white standards, the color shift becomes effective thirty times each second. With the tricolor system this implies that the same color is repeated for each line into which the image raster is assumed to be formed ten times per second. To bring about this color change, the line scanning is controlled or influenced in accordance with the field scanning operation, after exercising appropriate control thereover.

To this end, pulses occurring at the field scanning rate of the assumed 60-cycle field repetition are applied at the input terminal 141. These pulses are of relatively short duration compared to the spacing between them. The pulses occur at the rate of 60 per second and they are fed through the coupling condenser 142 upon the grid or control electrode 143 of an amplifier tube 144. The tube is biased by way of the cathode resistor 145 with the resistor elements 146 and 147 forming a voltage divider arrangement through which the signal is impressed upon the tube grid. Operating voltage for the tube is applied from a connection of a positive voltage source to the terminal 148. Suitable plate or anode voltage is impressed through the tube load resistor 149, while suitable voltage for the screen is impressed in known manner through the screen resistor 150. The pulses occurring at the 60-cycle rate impressed at the input terminal 141 are applied in negative polarity so as to appear as positive polarity pulses of amplified form in the output of the tube 144 and across its load resistance 149, as has been indicated. These pulses occurring at the 60-cycle rate are then fed through a coupling condenser 151 into the double diode tube 153 of a counter in such a way as to be impressed both upon the cathode 154 of one-half of the diode and the anode or plate 155 of the other half of the diode. The other anode or plate 156 is grounded at 81, while the second cathode 158 connects through to series-connected condensers 159 and 160 to ground. In this connection, as was explained with respect to the double diode and counter circuit above for tube 87 (in connection with the line frequency timing impulse input) the lower condenser 160 is considerably larger than the condenser 159. The counting arrangement and the circuit parameters selected are such that the output from the counter, which is of generally known character and operation, and which has been shown as illustrative of one form which the invention may assume, is a pulse counted down in the order of 6:1. Thus, the output pulse from the counter circuit associated with the double diode 153 and which appears in conductor 161 is a series of notched pulses repeating at ten cycles per second. These pulses are fed then to the amplifier 165 in a manner which is substantially a duplication of that explained in connection with the amplification of the counted-down line frequency pulses fed through the tube 98 as herebefore explained. To repeat briefly, however, the reduced frequency pulses appearing at the condensers 159 and 160 connected at the output of the tube 53 and in conductor 161 are supplied through the primary winding of the transformer 166, which winding is damped for the low frequency pulses by the shunt-connected damping resistor 167. These pulses are then fed in parallel to each of the grids or control electrodes 168 and 169 of the tube 165. The plate or anode electrode 170 of the first half of the tube then feeds back through the secondary of transformer 166 to a source of positive voltage connected at the terminal point 171 with the feedback occurring then through the resistor 172 shunted by suitable condenser 173. Bias to control the frequency is applied to the cathode elements 174 of the tube 165 by way of the variable resistor 175, which is shunted by capacity element 176. This bias is derived from the source of positive potential connected at the terminal point 179, as was the bias for the cathode elements of the tube 98 in connection with the supply through the resistor 103. The same source of voltage which connects at the terminal 179 supplies also plate voltage to the second half of the tube 165 by connecting to the anode or plate 180 thereof through the plate or load resistance 181. The frequency of the counter output is determined by using variable resistor 175 to set the bias on tube 165 so that at time periods when the voltage effective from condensers 159 and 160 on the tube grid 168 is sufficient to overcome this bias the tube will pass current and the condensers will be discharged. The operational cycle is thus set.

The signals appearing across the load or output resistance 181 are then fed or supplied through to separate paths to two separate control or pulse shaper circuits, which each comprise essentially a multivibrator unit and a terminating mixer tube which adds the output from the separate pulse shaping units. Referring particularly to the form of circuit illustrated by Fig. 5*a*, the low frequency pulse output occurring in the assumed example at 10 cycles per second coming from the tube 165 and developed across its output resistor 181 feeds in one path through the resistor 182 and the rectifier 183 in negative polarity. The rectifier 183 is preferably in the form of a germanium alloy crystal semi-conductor and, like the rectifier 121 previously described, may be of the 1N34 variety, by way of example. The pulse signal output appearing across the load resistor 181 of the tube 165 is of such polarity that current flow through the diode tends to be reduced at times when the pulse decreases in amplitude. This then leaves the potential on the cathode side of the diode (that side connected with the multivibrator) also of negative polarity, so that when this pulse is applied through the condensers 184 and 185 to the grid or control electrode 186 of the first half of the multivibrator tube 187 it will tend to interrupt the current flow through the first half of the tube. This, of course, in accordance with normal multivibrator practice, tends to increase or raise the potential effective at the plate or anode end of the load resistance 188 for the first half of this multivibrator tube 187. Operation of the tube is provided by supplying positive voltage from a source (not shown) connected at terminal 189 to the plate 190 of the first half of the tube through to load resistance 188 and to the plate or anode 191 of the second half of the tube, through to plate or load resistance 192, which then connects in series with the resistor 193 shunted between condenser 194 to provide some filtering.

With the ordinary multivibrator functioning for the tube 187 it is apparent that as the first half of the tube tends to draw less current through the application of a negative pulse on its grid or control electrode 186, and plate potential tends to rise, this raising of potential becomes effective at the grid or control electrode 195 of the second half of the tube by reason of its connection to the plate 190 through the condenser 196, and accordingly, the second half of the multivibrator tube tends to have its current increase with the result that the plate potential effective at the plate or anode 191 decreases and is transferred back to the grid or control electrode 186 through the condenser 185, to cause the first half of the tube to draw all the less current and provide the well-known snap action. The resistor 198 provides a grid leak for the charge acquired by the condenser 185. Bias is applied to the second half of the multivibrator tube 187 by connecting its grid to a source of positive voltage (not shown) connected with the terminal point 199 and effective at the grid through the resistor 201, the variable resistor 202, and the grid resistor 203. One side of the resistor 202, as is indicated, connects to ground through a second section 204 of resistance forming a voltage divider arrangement. It can be seen that an adjustment of the variable tap on the resistor 202 will change the bias effective on the grid or control electrode 195 so as to change thereby the width of the resulting output pulse, which is derivable from the multivibrator unit. In this instance the useful output from the multivibrator unit is obtainable from the first half of the tube.

The period over which the output from the first half of the tube appears as a positive pulse in order that it may exercise its share of control on the mixer tube 207, later to be described, is determined in accordance with the operation and position of the width control adjustment effected by tapping to the resistor 202. It will be appreciated that as the second half of the tube 187 draws more and more current, finally a point is reached where grid current is drawn and the condenser 196 tends to charge negatively to block the tube. The point at which this occurs will be determined by the several operating conditions established, included among which are the size of the condenser 196, the value of the leak resistance, and the bias applied. If the second half of the multivibrator tube 187 is blocked or biased to a cutoff state, of course the first half of the tube tends to draw current by reason of the fact that the plate or anode 191 connects to the grid or control anode 186 through the condenser 185, and at such periods the potential at the plate is reduced; however, with the incoming pulse from the output of the counter circuit effective to cut off the first half of the multivibrator it is, of course, apparent that the time of initiation of any pulse waveform which can be fed by way of the coupling condenser 208 across the grid resistor 209 and into the grid or control electrode 210 of the mixer tube will be established, and the wavefront steepness controlled. The duration of such a pulse is then controlled by virtue of the period over which the incoming pulse operating at the count-down ratio is effective to hold the first half of the multivibrator tube 187 at a cutoff state. The amplitude output signal from the mixer unit due to the applied pulse on the grid or control electrode 210 may then be varied or controlled by virtue of the bias change effective in the cathode circuit of the first half of the mixer unit, brought about through a variation in size of the cathode resistor 211. It will be noted that positive voltage for application to the plate electrodes 212 and 213 of the mixer tube is applied from a source (not shown) connected at a terminal 214 and connected to the plates through the tube load resistors 215.

The other half of the output from the counter used to provide the time to establish the starting edge of the pulse effective in the mixer unit is supplied through a resistor 221 and a diode 222 similar to that shown at 183 above and fed through condensers 223 and 224 into the grid 225 of the multivibrator tube 226, with the signal application being across the grid resistor 227. The multivibrator tube 226 is preferably in the nature of a double triode and functions generally similarly to the tube 187 above described. This comprises the two triode sections having the plate elements 228 and 229 of the first and second sections respectively supplied with positive voltage from a source (not shown) connected at the terminal 230 and supplied through the load resistor 231 of the first tube half and 232 of the second tube half. Resistor 233 and the condenser 234 function similarly to the respective elements 193 and 194 above described. A feed from the first section of the multivibrator to the second is provided by the connection established through the condenser 240 to supply voltage to the grid or control electrode 241 of the second half of the tube. Bias is applied from a source of positive potential (not shown) connected at the terminal 242 and effective through a group of serially-connected resistors 243, 244 and 245 upon the tube grid with the addition of the resistor 246 to ground, serving to function as a voltage divider. Adjustment of the tapping point of grid connection to the resistor 244 controls the pulse width of the output signal derivable from the multivibrator. This signal, as was the case in connection with the output from the multivibrator 187, is derived at the first half of the multivibrator and across its load resistance 231 so that a signal of positive polarity is fed through the coupling condenser 247 and into the grid or control electrode 248 of the second half of the mixer tube 207 across the grid leak resistance 249.

In the normal design it has been found desirable to control the value of resistance 211 in the cathode circuit of the mixer tube in such a way that the amplified pulse appearing in the output of the mixer 207 and due to the pulse supplied on the mixer grid 210 shall have an amplitude of substantially half that due to the pulse applied through the condenser 247 to the grid or control electrode 248. Likewise, through the control of the adjustable tap on the resistor 202 for the multivibrator unit 187, it was pointed out that it was possible to control the width of the resultant output pulse. It was also pointed out that a similar effect could be had by a variation of the tapping point to the resistor 244 for the multivibrator unit comprising tube 226. It is desirable for most uses that the time duration of the pulse derived at the left half of the tube be due to the amplitude of the voltage effective on the grid or control electrode 210 and that it shall be of approximately half the duration of the greater amplitude pulse obtainable at the output of the mixer tube 207 due to the pulse supplied through the condenser 247 to the control electrode or grid 248. Thus, in the output of the mixer tube there is obtainable through the condenser 253 a pulse which represents the addition or sum of the amplified pulses impressed upon the input control electrode or grid elements 210 and 248. This pulse waveform is indicated in schematic form adjacent the conductor connecting the coupling condenser 253 to the amplitude control resistance 254 which connects to the grid or control electrode 255 of the phase shift voltage amplifier tube 260 which was above referred to as being the controlling device to establish the bias effective upon the sawtooth clipper diode 136.

Thus the combined output of the voltages derived from each half of the mixer tube 207 is applied concurrently to the control grid of the phase shift voltage amplifier 260, whose bias is in turn controlled through the adjustable connection of the cathode 261 to the resistor 262 serially connected with a second resistor 263 which connects to a terminal 264, whereat a source of positive voltage (not shown) is applied. The tube anode or plate 265 connects to a source of positive voltage (not shown) connected at the terminal 266 and through to the tube 265 by way of the two resistor elements 267 and 268, at the junction of which is a third resistor element 269 connected to ground at 81. This combination of resistors forms a voltage divider by which the potential effective at the cathode element 270 of the diode 136 through the resistor 139 may be varied up and down in accordance with the steps in the output wave represented as a changing voltage effective at the plate or anode 265. Thus, with the impressed wave upon the plate 135 of the diode being of sawtooth wave formation and the bias on the diode being progressively varied between three separate levels marked *a*, *b*, and *c*, respectively, on the wave of output voltage, it will be appreciated that the commencement of current flow through the diode can be made to vary in time in accordance with the position of the sawtooth wave. With the division of the changes in amplitude, control of the bias level on the diode 136 effective at uniformly spaced time intervals, it is apparent that a rising value of the sawtooth wave will progressively represent the different levels at which current can flow through the diode. Thus, with the sawtooth wave being linear and with the potential at the plate of the phase shift voltage amplifier changing from one level to another each $\frac{1}{30}$ second (the time cycle for the three changes being $\frac{1}{10}$ second as per the assumed conditions hereinabove), it becomes apparent immediately that the commencement of the pulse of current effective at the grid 271 of the pulse phase shifter tube 272 is determined in accordance with the time of commencement of current passage through the diode clipper 136. In this connection the condenser 273 and the resistor 137 connected in the output circuit of the diode and to the cathode thereof, form a differentiator network so that there is applied to the control grid 271 a pulse to cause the commencement of current flow where the initiation of the pulse is at one time or another depending upon the amplitude of the sawtooth attained at the time the clipping diode 136 starts to pass current. A well-known form of cathode connection comprising the cathode resistor 275 and bypass condenser 276 provides bias on the first half of the tube 272. The signal output from this first half of the tube is derived across the resistor 277 and supplied through the combination of the shunt connected condenser 278 and resistor 279 to the grid or control electrode 280 of the second half of the tube.

The waveform shown as effective at the output of the tube 260 is merely one representation of various forms which may be obtained and the order of shift in bias on the diode clipper 136 may be varied in accordance with any desired pattern. This, in turn, obviously could be brought about through a control of the width and height of the pulses obtained in the output of the tubes 266 and 187 respectively, which would be controlled, for instance, by a variation in the bias setting obtainable in connection with the tube 187 by varying the position of the adjustable contactor to the resistor 202. Similarly, in connection with the tube 226, a pulse width is obtained by variation of the adjustable contactors on the resistor or potentiometer 244. It is, of course, apparent that in some conditions it might be desirable to add additional tubes prior to combining the outputs where the addition provides for the obtainment of additional wave shapes if desired, but which operate in principle in accordance with the teachings and disclosures of the operation obtained and described in connection with the tubes 187 and 226 and their combined circuit components.

With the sawtooth applied at the plate 135 of the clipping diode being of increasing amplitude with time, and therefore positive in sign as herein interpreted, it will be appreciated that the pulse output derived from the second half of the tube 272 and across its load resistor 281 and obtainable at the terminal point 282 is positive in sign also. The resistor condenser combination 279, 278 serves to provide some pulse shaping and clipping in the grid circuit of the tube, so that only the initial portion of the derived pulse is effective. It is this type of pulse output which is obtainable at the terminal point 282. Where desired, and where additional clipping is desired, it is apparent that the second half of the clipper diode 137 which second half comprises the anode 283 and the cathode 284 may be connected across the grid and cathode elements 280 and 285 of the second half of the pulse shifter and shaper tube 272, and functions in addition to the resistance capacity circuit to clip and shape the pulse.

It was above stated that at the terminal point 282 there was developed a series of pulses of which 5,250 occur each second, in the illustrated example, but wherein the position and spacing of the several tubes with respect to each other shifts from time to time so that thirty different pulse positions occur each second in the assumed standards of operation. The pulses which occur at this frequency and then are supplied by way of the conductor 295 to an input terminal 296 are what will be termed a "pulse shaper input."

The pulses supplied from the terminal point 282 to the terminal point 296 are what will be termed, for descriptive reference, "shifted time pulse inputs." These pulses are then supplied (see particularly portion B of Fig. 5 for this portion of the circuit) by way of resistor 297 and the capacitors 298 and 299 to the grid 301 of a multivibrator tube 302 which tube is of the double triode variety and of which the grid or control electrode 301 may be assumed for reference purposes to be included in the first half of the tube.

Suitable biasing voltage for controlling the operation of the first half of the tube is supplied by connecting to the terminal point 304 a source of positive voltage (not shown), which is supplied by way of a series of resistor elements serially connected, shown at 305, 306 and 308, with the resistor 306 being in the nature of a potentiometer, so that the variable contactor point which connects to the grid resistor 308 may be shifted. That portion between this variable contactor point and ground is preferably shunted with a bypass condenser 309.

The multivibrator unit composed of tube 302 and its associated circuit components functions in a manner closely related to that explained above for tubes 226, 107 and 111, and serves essentially the broad purpose of shaping the applied pulses. The plate or anode elements 310 and 311 are supplied with positive voltage from a source (not shown) connected with the terminal point 312 through the decoupling resistor 313 and the anode load resistors 314 and 317 for the anode 310 and the anode load resistor 318 for the anode 311. The resistors 314 and 317 also serve as a voltage divider, so that the potential made effective on the grid 321 of the tube 302 by way of the condenser 319 connecting to the junction of resistors 314 and 317 is proportional to the voltage drop occurring through the two resistors 314 and 317. The resistor 320 forms a grid leak resistor for the right-hand half of the tube 302.

The bias on the first half of the tube is supplied accordingly from the terminal point 304. Generally speaking, the waveform of the voltage effective at the grid 301 is in the nature of a sawtooth increasing in amplitude in the positive direction, and when approximately two-thirds of the cycle of operation between the incoming pulses applied at the terminal 296 has been completed the pulse input in the positive direction at point 296 becomes effective at the grid 301. The potential at the grid 301 rises sharply in a positive direction. With this occurring, the first half of the tube 302 tends to draw grid current and so the condenser 299 then charges negatively toward the grid and the potential at the grid drops sharply, whereupon the tube cuts off and the sawtooth portion of the wave again commences and the pulse cycle is repeated. Accordingly, with the sharp rise in grid potential effective at the grid 301, it is apparent that the potential at the junction of resistors 314 and 317 is reduced due to greater current flow through the tube, so that the grid 321 tends to be carried towards its cutoff state and the potential at the plate rises to assist the operation of the first half of the tube. The result is that a negative pulse of rather steep wavefront which is squared at its commencement is developed at the plate to be fed to the mixer tube 330 next to follow. The width of the pulse is determined substantially by the setting of the variable contactor on the potentiometer resistor 306 which determines the slope of the sawtooth portion of the applied voltage waveform.

The signal output from the pulse shaping multivibrator circuit formed to include the tube 302 is then supplied by way of the coupling condenser 325 through the voltage dropping resistor 326 and across the grid resistor 327 to the grid or control electrode 328 of the pulse shaping and/or mixing tube 330, which was described in connection with the unit 34 of Fig. 4. Operating voltage is supplied to this tube from the source connected at terminal 312 through the choke 331 and the load resistor 332 to each of the plate or anode elements 333 and 334. The tube 330 serves to mix the output occurring at the pulse frequency of the multivibrator unit including the tube 302 and also a substantially standard line frequency driving pulse input occurring in this instance at the assumed 15,750-cycle rate, which is supplied at the terminal point 335. This synchronizing pulse signal is fed to the unbiased grid or control electrode 336 through the condenser 337. Grid leak resistor 338 permits the charge acquired by the condenser to leak to ground and the arrangement is also of such a nature that a certain amount of clipping and wave shaping occurs in the grid circuit of the tube in a manner closely approximating that heretofore adopted for sync signal separation.

Thus, with the signal pulses shifted in time and occurring at the 5,250-cycle rate as applied at the input terminal 296, it can be appreciated that those pulses which are fed on to the grid or control electrode 328 occur at one-third the frequency of the negative polarity pulses at the normal black-and-white line frequency rate of 15,750 cycles which are applied at the terminal point 335. The signals at the 5,250-cycle rate applied to the grid or control electrode 328 are also of negative polarity, so that each input signal is available at each of the plate or anode 333 or the plate or anode 334 across the load resistor 332 and appears in the positive sense or polarity. Due to the lower frequency pulse input at the terminal 296, every third high frequency pulse available in the output of the two sections of the tube 330 is forced outwardly as indicated by the waveforms shown, and extends above and beyond that level at which the normal input sync pulse of the 15,750-cycle rate applied at the terminal 335 can appear.

The output signals from the mixer tube 330 which are derived across the load resistor 332 are then supplied by way of the conductor 340 and have the general appearance corresponding to that waveform shown adjacent to conductor 340. It will be seen that the pulse input that was derived at the point 296 occurs at the stated frequency of 5,250 cycles, corresponding to the rate at which the several color lines are capable of being repeated. The pulse width, however, at this point may be subjected to some shift or variance in width, and therefore when the negative input pulses furnishing the drive on the grid or control electrode 336 occur at the 15,750-cycle rate (the line repetition rate), it will be seen that those pulses which coincide in time with that at which one of the pulses of the 5,250-cycle rate appears at the terminal 296 will be forced outwardly as indicated, and form a peak, as it were, superimposed upon the low frequency pulse. The effect is obtained, however, of ascertaining the pulse wherein the slots later to be described will appear.

This waveform is then supplied to two parallely connected utilization channels.

The first of these utilization channels includes the clipper tube 341, which is supplied with the signal appearing in the conductor 340 by way of capacitor 342. The tube 341 serves as a clipper and it will be noted that it is unbiased with the leak resistance 343 connecting to ground at 81, to which the tube cathode also connects and the signal being supplied through the condenser and across this resistor and through resistor 344 upon the tube control grid 345. By reason of the fact that the tube draws grid current at certain time periods corresponding to the peaks of the pulses applied, it will be seen that a signal clipping effect results and that the signal waveform appearing across the output or load resistor 346 connecting the tube plate or anode 347 to a suitable source of operating voltage (not shown) connected at terminal 348 is of the general waveform and shape indicated in the conductor 349. This is a negative pulse and is fed through the coupling condenser 350 and across the grid resistor 351 upon the grid or control electrode 352 of an output tube 353. The output tube has its plate or anode 354 supplied with operating voltage from a terminal 355, to which a suitable source of voltage, not shown, is connected. A low impedance output from the tube is derived by connecting a load circuit (not shown) at the terminal point 357, so that it is connected across a resistor 358 connected in series with the resistor 359 and in turn to the tube cathode 360. The resistor 359 may be bypassed by the condenser 361 if desired. Generally speaking, the cathode resistors 358 and 359 are of very low value and in one preferred form the resistor 358 is of the order of 1,000 ohms and the resistor 359 is of the order of 120 ohms, so that the 5,250-cycle selected drive pulse is obtained without polarity inversion from the tube 353 at the terminal point 357.

The other portion of the output from the mixer tube 330 is applied through a condenser 370 and the resistors 371 and 372 upon the grid or control electrode 373 of a further clipper tube 374. This tube 374 functions in a manner substantially like that shown for the tube 341 in connection with the other output channel from the mixer tube 330. Output voltage from the tube is derived from the plate or anode 375 across the output resistor 376 with positive tube operating voltage being supplied at a terminal point 377. These output signals then feed by way of the coupling condenser 378 into a delay line conventionally represented at 380. This delay line consists of series-connected inductance elements 381 and shunt-connected capacity elements 382. The tube 374 has functioned to sharpen the leading edge of the output pulse which is clipped, and after the delay introduced by the delay line 380, the delay signal output is fed through the resistor 384 and the condenser 385 into the tube 386 upon the grid or control electrode 387 thereof. This tube is for the purpose of providing a low impedance output for the signal to feed into the further mixer and amplifier stages. In this instance the tube 386 functions again to shape, to some extent, the several input changes supplied through the resistor 388 and across the grid resistor 389. The output is derived at the tube cathode 390 across the resistor 391 which connects in turn to ground at 81.

Some degeneration, of course, occurs in the tube 386, so that the peak-to-peak voltage output available to be supplied through the condenser 392 and resistor 393 into the multivibrator unit consisting of the tube 395 and its associated circuits is less than that appearing at the output of the resistor 384. However, such voltage as is present is fed upon the grid or control electrode 396 of the tube 395 through the condenser 397. The grid or control electrode 396 is normally supplied with positive bias from a source, not shown, connected with the terminal 398 and feeding to the grid through the several resistors 399, 401 and 403, with an adjustable tapping point provided on the resistor or potentiometer 401 so that the positive voltage then feeds through resistor 399, a part of resistor 401, and the grid resistor 404, and on to the tube grid.

The multivibrator unit thus tends to draw current in the first half of the tube between the tube cathode and the plate 405 during periods when signal input pulses are absent. The signal input pulses tend to reduce the current flow through the tube whereby the potential effective at the junction point of the tube plate resistors 406 and 407, which in turn connect to the terminal 408, whereat positive voltage from a source not shown is supplied, will raise and be transferred through the condenser 410 across grid resistor 415 to the grid or control electrode 411 of the other half of the tube from which the current flow within the second half is controlled. Accordingly, current flowing in the second half of the tube to the plate or anode 412 and becoming effective across the plate resistor 413, also connected with terminal 408, then tends to reduce still further the current flow through the first half of the tube and thus sharpen very considerably the abruptness of change in the output conditions. Accordingly, the output signal as derived at the plate of the first half of the tube and obtainable through the resistor 417 and the condenser 418 is of the general shape and waveform shown as being applied to the grid element 419 of a mixer tube 420. The mixer tube 420, as can be seen, operates without bias with the grid leak resistor for the first half of the tube being shown at 421. Accordingly, the mixer tube tends to operate to clip to some extent the input pulse, although the pulse retains its sharp leading edge and is of a width which is determined in accordance with the setting of the bias on the tube 395 at the variable resistor 401. The pulse input to the grid or control electrode 419 is of positive polarity, so that with polarity inversion occurring within the mixer tube the pulse polarity at the plate or anode 422 and available across the plate resistor 423 appears in the negative direction. Positive voltage for operating the tube anodes 422 and 424 is supplied to these elements through the plate resistor 423 from a source not shown connected to the terminal point 425.

At the other grid or control electrode 427 of the mixer tube 420 line synchronizing pulses occurring at the standard line frequency repetition rate of 15,750 cycles are supplied in negative polarity at the terminal point 428, and fed through the grid condenser 429 and across the grid resistor 430 into the second half of the mixer tube. As was the case with the first half of the mixer tube, this second half likewise operates without bias. The sync signal is applied at the input 428 in the form of a standard line sync pulse having a duration of the order of 0.08H (where "H" is the line duration). Polarity inversion also occurs in the second half of the tube with the result that the output signal appearing at the plate 424 is the input sync signal inverted in polarity.

However, since this signal is combined with the negative output pulse due to the signal supplied at the first half of the tube, the result is that a slot is cut, as it were, into the output pulse, with the result that the waveforms effective and resultant at such time as an input pulse appears upon the grid or control electrode 419 coincidentally with any impressed line sync pulse the waveform and relationship of the combined output will be substantially that shown adjacent the output conductor 435 connecting through the coupling condenser 436 from the plates 422 and 424 to the grid or control electrode 437 of further output and wave shaper tube 438. It was pointed out above that the pulses appearing upon the grid or control electrode 419 appear only at the 5,250 cycle rate. Therefore, it can be seen that only every third synchronizing pulse is generally slotted or only those synchronizing pulses are slotted which coincide in time of appearance with the receipt of a signal upon the grid or control electrode 387 of the tube 386. The general phase relationship, however, of the impressed signals on the grid or control electrode 387 or the tube 386 may change, and does change from time to time due to the bias applied by way of output of the tube 260 to the clipper diode 136, which controls the phase relationship of the output pulse at 5,250 cycles effective at the terminal point 282 and thus, depending upon the phase shift from time to time of the pulse at the output point 282, will determine which of the several line sync pulses become finally slotted.

It can be seen that from the polarity of the incoming signal appearing in the conductor 435 and supplied to the grid 437 of tube 438 across the grid leak resistor 439, that some clipping in the positive direction tends to take place. Then the output from the first half of tube 438 which appears at the plate or anode 440 and across the plate or anode resistance 441 is fed through the coupling condenser 442 to the second half of the tube by connecting to the grid or control electrode 443, which has the leak resistance 444 connecting it again to ground. Since the second half of the tube which operates in cascade with respect to the first half is also unbiased, it can be seen that some clipping likewise occurs in the second half of the tube, as well as the first half. Accordingly, at this time, the single pulse which appeared in the negative direction beyond the slot in the conductor 435 is now removed and clipped off, so that the signal finally available and appearing in the plate or anode electrode 446 and across the plate or anode 447 is of the general form of that shown at the terminal point 450, connected at the cathode output of the output tube 460. Suitable operating plate voltage for the tube 438 is supplied at the terminal 451 to be fed through each of the plate resistors 441 and 447 to the plate or anode elements 440 and 446, respectively, thereof.

The twice clipped slotted pulses and sync pulses intervening are then supplied through the coupling condenser 453 across the grid resistor 454 to the grid or control electrode 456 of the output tube 460. Positive operating voltages for the anode 457 supply from a terminal point 458 through the plate resistor 459. The cathode 461 connects through to cathode resistors 462 and 463, the latter of which is grounded at 81, so that across the cathode resistor 463 and between the terminal point 450 and ground the desired form of color plus the black-and-white synchronizing pulse is derived. This pulse is then of the waveform such as to be mixed into the output signal for transmission and, for instance, might be that pulse which is supplied to the mixer amplifier 17 from the color sync signal generator 18 as diagrammed in Fig. 3.

In the pulse waveform shown at the terminal 450 the letters GR are intended to exemplify, for instance, a pulse which would control the beam deflection as it enters an area to produce a green line of image, the pulse BL might signify the type of control pulse to control beam deflection in the line pattern as the beam enters the so-called blue area, and what are considered herein and have been suggested as the significant control pulses for the color selection have been designated as RE and constitute the slotted pulses which have been illustratively exemplified as controlling the scanning as the beam enters into the red direction.

Further, where the low impedance output is not desired the output signals available at the plate 446 of the tube 438 may serve as the useful signals to control the mixer amplifier or any other unit wherein the video signals (for instance) and the sync signals (i. e., the modified line variety herein described as well as the field or vertical signals) are combined.

Although wide variation in circuit components may be relied upon for operation certain tube types which have proven satisfactory in operation will herein be listed purely as illustrative and not limiting of the usable forms:

| Tubes | Tube Types |
|---|---|
| 77 | 6AC7 |
| 87 | 6H6 |
| 98 | 6SN7 |
| 111 | 6SN7 |
| 136 | 6AL5 |
| 272 | 6SL7 |
| 144 | 6AC7 |
| 153 | 6H6 |
| 165 | 6SN7 |
| 187 | 6SN7 |
| 207 | 6SL7 |
| 226 | 6SN7 |
| 260 | 6AC7 |
| 302 | 6SN7 |
| 330 | 6SL7 |
| 341 | 6AC7 |
| 353 | 6L6 |
| 374 | 6AC7 |
| 386 | 6AC7 |
| 395 | 6SN7 |
| 420 | 6SN7 |
| 438 | 6SN7 |

In the receiving end of the system herein described, it is particularly important and desirable that the changes of the normal black-and-white receiver for making the receipt of the color images possible shall be minimized. Likewise, it is important that the transmission of signals depicting color shall be equally usable for the black-and-white operation. Accordingly, since the received signals embody each and every characteristic of the now-used black-and-white image transmission signals they can be used without alteration or modification on any known now commercially sold black-and-white television image receiver to reproduce television images in black-and-white monochrome having the same characteristics as if the transmission had actually been representative of black-and-white only instead of the sequential line additive multicolor herein described.

For the reception of color signals and the reproduction of color images, however, it may be assumed for illustrative purposes that the receiver is in accordance with the schematic showing of Fig. 6 with certain particular components thereof, such as the line sync filter shown in further detail in Fig. 7. In this receiver the color signals and the sync signals are assumed to be received upon the dipole 501 or any other suitable form of receiver mechanism to be supplied to the input stage of the receiver, which stage is usually in the form of a radio frequency amplifier 502. This unit includes the normal selectors for selecting signals from one to another channel. Also, it provides for making the selection so that the proper video signals and the thereto related audio signals are received to the exclusion of a mixture of video and audio from different transmitting points. The output from the R. F. amplifier 502 is then supplied to a converter stage 503, which is also supplied with locally generated carrier from an oscillator 504, so that the converter 503 forms the first detector of the superheterodyne receiver arrangement. The converter develops at its output both video and audio intermediate frequency modulations with the audio signals appearing as frequency modulations on a carrier which is spaced a finite distance (such as 4.5 megacycles) from the carrier upon which the video appears. Various forms of arrangements for receiving and separating the audio signals are known, among which are the so-called intercarrier sound method, where the audio modulation is transmitted through the video I. F. amplifier and then detected as the beat signal. In the alternative, the developed audio frequency signals may be fed directly, as in the form illustrated by Fig. 6, to an audio frequency I. F. amplifier 505, where they are fully amplified and finally limited, if necessary, and then supplied to the audio second detector or discriminator 506. Any further amplification that becomes necessary is provided in the audio amplifier 507, whose output is supplied to the sound reproducer or loud speaker 508.

The video signals appear also as intermediate frequency signals at the output of the converter 503 and accompanied by the necessary information to provide for synchronizing the scanning motion of the cathode ray beam developed within the image producing cathode ray tube 511 on the termination area 512, of which the resultant images are to be developed.

The video and sync signal modulations appearing as intermediate frequencies are supplied through the video I. F. amplifier of any known chracter for amplification, from the output of which they are supplied to the video second detector 514. Video signal modulation, as well as the synchronizing signal modulation, is then amplified in a video amplifier 515 and supplied to modulate in suitable manner the intensity of the developed cathode ray beam within the image producing tube 512. Since negative transmission is utilized, the synchronizing signal information and the accompanying blanking signals serve to blank the scanning beam in the image producing tube 512 during its snapback period.

While not shown for reasons of simplicity, it is customary in connection with the video amplifier 515 to provide appropriate circuits and controls for reinserting the direct current component which is lost due to the fact that the amplifiers are normally of the A. C. variety. Circuits of this character are of generally standard form and no specific exemplification has been illustrated for reasons of simplification. In some instances, of course, the connections from the second detector to the image producing tube through the video amplifier are provided as D. C. connections, so that D. C. reinsertion controls need not be included, but in that event it is important that there be added to the circuit appropriate automatic gain controls, which function to maintain the proper signal level. The automatic gain control can also be used with the D. C. insertion circuits, although not completely essential. Automatic gain control circuits are also found in presently marketed commercial receivers, and therefore need not be included in detail in this schematic showing.

Synchronizing signals, as transmitted and as schematically represented by the waveform appearing, for instance, in Fig. 2 or Fig. 4, are fed to a suitable form of sync operator 517, connected to receive the output of either the second detector or the further amplified signal as it leaves the video amplifier. The sync separator serves to clip or separate the sync signal information from the video signal and is a well-known instrumentality. The same unit also serves to separate the long duration field or vertical synchronizing pulses from the short duration line or horizontal synchronizing pulses, with the vertical or field deflection pulses usually segregated through the use of suitable forms of integrating circuits and the short duration horizontal or line synchronizing pulses generally derived through the use of well-known forms of differentiating circuits.

In the diagram of Fig. 6, the long duration vertical synchronizing pulses are assumed to have been separated to be supplied to a field deflection circuit schematically represented at 518, from which the output is supplied to control the schematically represented deflection coils 519.

Such line control synchronizing signals as are present are segregated from the long duration vertical information by way of the line sync filter 521, which filter serves to separate also the slotted color control signals from the remaining portion of the sync pulses and thus, for instance, separates such slotted pulses as are designated by the letters RE, as in Fig. 2, from the pulses which are designated by the letters GR and BL in the same figure.

The particular circuit which accomplishes this result is schematically represented in Fig. 6 and is shown in further detail by the circuit diagram of Fig. 7. It includes broadly a suitable means for supplying the output of the sync separator 517 for combination with and addition with a pulse effective to control the line deflection of the scanning beam within the cathode ray image producing tube 511. In the illustrated example recurring pulse at a frequency of 5,250 cycles is derived from the line deflection coil, for instance, as will be explained in connection with Fig. 7.

Because of the fact that the line deflection within the cathode ray image producing tube 511 shall operate as of the commencement of each of the pulses, it is desirable that the separated slotted pulses as derived from the output of the line sync filter 521 shall be slightly shifted in phase so that the slotted portion of the pulse signal is available for utilization as if effective as of the time of commencement of the pulse itself.

Present standards call for the line sync pulse as being upon a pedestal, which is 0.08H in width, where H represents the duration of each line of the reproduced image. Accordingly, if it is assumed that the slot cut into the control pulse is of a width corresponding to 0.02H (as is designated, for instance, at the output terminal 450 in Fig. 5b), then it will be apparent that the first portion of the slotted pulse is of a duration of 0.03H, followed by a slot of 0.02H, and followed by a pulse of a width of 0.03H. Trigger action in the deflection circuits is generally effective under the control of the leading edge of the pulse, but since it is also due to the fact that the pulse to control the red signal reproduction, for instance, is slotted, that makes possible the selection of the color, and since it is likewise desirable that the color selection be initiated as of the time of commencement of the synchronizing pulse, it becomes apparent that while the delay in the time of appearance of the slot in the pulse signal is an extremely short period, nonetheless a shift in phase relationship of the pulse will result in the commencement of line deflection at precisely the proper time and improve fidelity. Therefore, the line sync filter may also include a phase shift arrangement which will be more particularly referred to in the description of Fig. 7. Suffice it to say, therefore, that the output of the line sync filter 21 is supplied to the line deflection control circuit 522 to control circuit 522 to control the deflection of the scanning beam within the image producing tube 511 in the line of horizontal direction through the deflection coil 519'.

The hereinbefore mentioned copending application, Serial No. 747,452, disclosed one form of arrangement whereby the several separate color images might be reproduced in juxtaposed relationship on the image reproducing tube, such as that depicted schematically in Fig. 6 at 511. A form of arrangement similar or like that disclosed in said pending application may be utilized in practicing this invention. To do so it is usually desirable that the several component color image areas be arranged adjacent each other. Following the teachings of this particular application it will be seen that the order selected for representing the component colors is to have the green image area centralized and the red and blue at either side thereof. This is frequently desirable because of the fact that the eye is particularly sensitive to the green image and it often becomes desirable more centrally to locate it. However, various locations other than that suggested follow from the invention herein disclosed. Suffice it to say, therefore, that in one form of this invention the target area 512 of the image producing tube 511 may be caused to respond over different sections to produce light of different colors or in the alternative the image may be produced in the target area as a black-and-white monochrome and through the utilization of suitable filter areas the resultant image may appear in the several different component colors. The separate images then resulting may be combined through the use of an appropriate optical system comprising lenses or prisms or combinations thereof or other types of optical instrumentalities to produce the projection image which is to be viewed. A method for providing this type of image combination is also set forth in the last named copending application. In some instances it is possible to utilize a direct viewing tube for bringing about the color image reproduction, but since the exact form of image recreating and producing tube is per se no part of this invention, the form of arrangement suggested by the copending application is proposed as illustrative of one that may be adopted and practiced.

Reverting now to Fig. 7 for further consideration of the line sync filter unit 521, there is supplied at the input terminal point 525 thereof a pulse signal in this illustrated example of a frequency of 5,250 cycles. This is the frequency of line deflection for a 525-line picture or image, where three successive lines of the image are scanned by television and wherein the scanning beam moves across three image rasters whose vertical edges are substantially contiguously positioned with respect to each other as was described above and also by copending application Serial No. 747,452. The pulse occurring at the 5,250 cycle rate may be derived through the connection of a coupling coil or the like with the reflection coil for establishing the horizontal deflection, so that the voltage effective at the coil to produce the sawtooth current is in the general nature of a pulse and this pulse then may be amplified and flattened or reshaped slightly if desired through an appropriate amplifier, from which it is supplied at the terminal point 525, then preferably to be fed through a suitable isolating amplifier 526 to be combined with the pulsing output from the sync separator 517, which is impressed according to the indicated waveform at the terminal point 527.

These separate pulses then feed through appropriate capacitors and resistors 528 and 529, respectively, for the low frequency pulses at the 5,250-cycle rate and 530 and 531 respectively for the pulse output from the sync separator appearing at the terminal point 527, so that combining of the signals occurs across the resistor 532. The combined waveform available at the junction point 533 of all of resistors 529, 531 and 532 is generally like that indicated.

The resistor 532 is shunted by a condenser 534, which serves generally as a filter or smoothing medium. It may be united without seriously affecting the operation. Connected to the junction point of all of resistors 529, 531 and 532 is a rectifier 534, which is preferably of the crystal variety such as that known in the art as the 1N34. The rectifier is so connected that its cathode element connects to the junction point of all of the aforesaid resistors and its anode element connects through condenser 536 and its shunt connected resistor 537 to the opposite terminal of the resistor 532 and to ground. The output is derived by way of a conductor 539 connected at the junction point of resistor 537, condenser 536, and the anode element of the crystal rectifier 535. In this respect it will be appreciated that the crystal rectifier serves to remove the peaks in the combined waveform shown at the point 533, which are due to the sync pulses intervening between successive slotted pulses, so that, as becomes apparent from the diagrammed waveform adjacent the conductor 539, that portion of the signal has substantially been eliminated. Likewise, the condenser 536 functions in a capacity somewhat like the usual differentiator, whereby the pulses extending in the downward direction that appeared at point 533 are accentuated, as indicated. The waveform appearing at point 533 is, of course, the summation of the signal pulses supplied at the terminal points 535 and 527, and thus the steep edge of the accentuated pulse due to the slotted signal impressed at the terminal point 527 has its leading edge commence in a time relationship corresponding to the commencement of the slot.

While the various circuit parameters of the selection circuit shown by this Fig. 7 are subject to some variation, certain values which have proven satisfactory in operation are given purely for illustration and are as follows:

| | Size |
|---|---|
| Capacity: | |
| 528; 530 | Each .25 microfarad. |
| 534 | 500 micro-microfarads. |
| 536 | 5,000 micro-microfarads. |
| Resistors: | |
| 529; 531; 532 | Each 2,200 ohms. |
| 537 | 1,000 ohms. |

In some precise operations it is desirable that this slotted pulse, which is to effect the scanning beam deflection in the horizontal or line direction, shall appear as if present at a time earlier in the cycle than that at which the slots appear. For this reason, it is usually desirable that the signal waveform in the conductor 539 be supplied to a phase shifter prior to the time it is fed into the line deflection circuit shown at 522 in Fig. 6, by way of terminal point output 541. The phase shifter may be of any suitable variety to provide the shift in time hereinabove outlined, as is necessary to satisfactory operation and thus may consist, for instance, of a series-connected condenser and a shunt resistor to ground, followed by an inductance element connected at the junction of the condenser and resistance and in turn shunted by a resistor to ground with the output at terminal 541 being that obtained at the junction of the resistor and condenser. The condenser and inductance elements and, if necessary, the resistors, may be made variable as desired to provide the necessary phase shift in controlled manner.

Due to the fact that some forms of line deflection control oscillator follow more rapid changes in synchronizing signals than others, various forms of circuits obviously may be used, as the field deflection circuit 518 of Fig. 6 and the line deflection circuit 522 of the same figure. Since so many circuits of such variety are known, no illustrative form has been proposed, but particularly by way of example and not in a limiting sense, the circuit known as the blocking oscillator may readily find application in this operation. The blocking oscillator is too well known to require further description and has been used in many commercial television installations. Therefore, suffice it to say that the control sync pulse such as does appear at the output of the phase shifter 540 is used to trigger the blocking oscillator and thereby to control promptly the deflection in the line pattern traced.

The foregoing description takes into account particularly the line or horizontal synchronizing control and provides certain of the line sync pulses with slots. This does not take into account, however, the fact that in standard transmissions for black-and-white the operation at the end of each field scanning is such that a certain established number (usually 6) of equalizing pulses are developed to be followed by a long duration pulse having slots therein which occur at double line frequency and which slots are of a width corresponding substantially to the duration of the horizontal or line sync pulses. The long duration slotted pulse is for establishing the control of the vertical or field deflection. This pulse is followed by a series of additional equalizing pulses occurring at double line frequency and each of substantially half the duration of the normal line sync pulses, after which the horizontal sync pulses of normal width (0.08H) are again caused to reappear.

The main function attained by this type of control pulse is to insure that line synchronization or deflection control is not impaired during the period of field deflection. It will be appreciated that if the proposal for control of color sequence operation hereinabove outlined is followed once during each of the equalizing pulse intervals and once during the vertical pulse interval there would be injected into the combined signal the slotted pulse combined color sequence and synchronizing control signal hereinabove described. It has been found that the injection of such pulses will not impair the control of field or line deflection, but in view of the fact that the system may be regarded as free-running to the extent that its operation will carry over for the few lines scanned in the interval between the last horizontal or line sync pulse of normal character and the next succeeding line impulse of normal character between which appear the above described two sets of equalizing pulses and vertical pulses, it has been found that the production of the series of color control pulses during this period of three lines in the image may be interrupted through suitable blanking where desired, or in the alternative, the color sequence control pulse may be caused to follow one of the equalizing pulses in each series and to provide an additional slot in one of the long duration vertical pulses without affecting the operation of normal black-and-white receivers which would be controlled by this same type signal.

It, of course, will be apparent from what has been stated above that in the scanning operation at the transmitter the juxtaposed image areas whereupon the translation of the separate component color images into video signals occurs actually are preferably spaced from one another by such an amount that as the scanning beam traverses the lines of the several areas in sequence the time required for the beam to move between the right edge of the first area, for instance, and the left edge of the second area, for instance, shall be that period of time equal to the time duration of the line scanning pulse (in the illustrated example hereof, a period of 0.08H). A similar effect shall take place, of course, between the right edge of the second area and the left edge of the third area. This provides, then, that there shall be a time interruption in the actual translation into video signals of the line signals of the separate component color images corresponding to the time elapsing for the transmission of the synchronizing pulses.

Also, it will be appreciated that while particular examples of standards which may be followed insofar as the line repetition, the frame and field deflection control frequencies and the interlaced pattern have been set forth, these represent generally the existing standards. Therefore, the principles underlying the present invention have been illustrated by taking recourse to such existing black-and-white standards. However, from practical standpoint, it will be appreciated that the invention is equally applicable to the standards such, for instance, as a greater or lesser number of lines of the image, and also to higher or lower field and frame deflection frequencies. According to operational standards in other countries, for instance, the field and frame deflection frequency may be either higher or lower than those in effect in the United States. Therefore, while the illustrations of suitable operating parameters herein given are proposed, it nonetheless is apparent that the main criteria which must be adopted are that the line frequency shall be high enough to provide the desired definition and that the field and frame frequency shall be high enough to prevent flicker, for instance, and, lastly, that the interlace relationship shall be such that the apparent definition is improved. Other modifications of selected parameters of course will naturally follow and the foregoing therefore may be considered merely as illustrative of what might be adopted.

Furthermore, while the herein described system is proposed and exemplified in respect to a system of standards coinciding with those used for black-and-white image signal transmission and reception, which system may be termed a "low band system" in that it uses only the relatively narrow six (6) megacycle band for transmission of the multicolor image and the accompanying sound, it is believed clear that the same principles will carry over and apply to systems using an increased number of lines, and an increase in any or all of the line, field and frame deflection frequencies which would increase the frequency band required for operation and thus transform the system into one which might be termed a "high band system" or a "wide band system." Since the principles upon which a system of the last named character would operate would not depart from those herein set forth and described no detailed reference need be made thereto beyond mentioning that under such conditions many operating time constants may be changed, as well as the selected and indicated values of various capacity, resistance and inductance elements, transformers, ratios and even tube types which will become apparent to those skilled in the art to which this invention is directed after a consideration of the illustrative examples herein set forth.

Having now described the invention, what is claimed is:

1. In a color television receiver wherein odd-line interlaced line-sequential additive color television scanning rasters are traced upon a cathode ray image producing tube target under the control of a series of color control pulse signals between the major portion of which pulse signals video intensity modulation signals are present, the combination comprising signal selection circuits to derive from the received signals information to control the intensity of the scanning raster traced upon the tube target and information to time the bidirectional tracing of the rasters, means to cause the video modulation signals to initiate the image recreation in a cyclically repeating order of component colors of the additive process for each successive line trace to produce successive lines of the raster in different component colors, and a color phase control circuit responsive to the color control pulses of the group to establish and shift from time to time the color order in which the raster lines are traced.

2. In a color television receiver wherein line-sequential additive color television images are recreated in a line for line manner upon the target area of a cathode ray image producing tube under the control of a series of color control pulse signals between the major portion of which video intensity modulation signals are present, the combination comprising signal selection circuits to derive video modulation signals from the received signals to provide information to control the intensity of the produced images, means to cause the lines of the produced images to be traced sequentially to represent different component colors indicative of the video signal modulation between successive control pulse signals, means to time the bidirectional tracing of the images under the control of the incoming signals, and a color phase control circuit responsive to the received color control pulse signals to establish an interlace of color in a sequence of traced image areas so that for successively produced image areas sequentially developed line traces develop image representations in different colors of a selected color cycle.

3. In a color television receiver wherein line-sequential additive color television scanning rasters are traced in a line-for-line manner on a cathode ray image producing target under a control of a series of time separated slotted and unslotted pulse signals between the major portion of which video intensity modulation signals are present, the combination comprising video signal selection means to derive from the received signals information to control the point-to-point intensity of the scanning rasters traced upon the tube target, means to derive from the incoming signals control information to time the bidirectional tracing of the developed rasters, means to cause the video modulation signals to initiate the image recreation in a cyclically repeating color order for each successive line trace of the scanned rasters, and a color phase control circuit responsive to the slotted pulses of the group of received pulses to establish a color interlace of the color order scanning so that from raster to raster lines of like space location are traced to represent different component colors of an additive color sequence.

4. In a color television receiver wherein images are created according to odd-line interlaced image fields each traced in line-sequential additive color television scanning patterns upon the target area of a cathode ray image producing tube under the control of video signal trains interspersed with a series of color control pulse signals, the combination comprising signal selection circuits to derive from the received signals the video information to control the intensity of the scanning raster traced upon the tube target area, means to derive from the pulse signals information to time the bidirectional tracing of the rasters, means to cause the video modulation signals to initiate the image recreation normally in a cyclically repeating color order for the successive line traces so that successive lines of the raster are developed to represent different component colors of the additive pattern, and a color phase control circuit responsive to selected color control pulses of the group of pulse signals to establish and shift from time to time the color order in which the raster lines are traced.

5. In a color television receiver for receiving signals transmitted according to a line-sequential additive color television scanning rasters to be recreated to visible representations by tracing a cathode ray beam across the target area of a cathode ray tube under the control of a series of time separated pulse signals between the major portion of which video intensity modulation signals are present, the combination comprising video signal selection circuits to derive from the received signals information to control the point-to-point intensity of the scanning rasters traced upon the tube target, deflection control circuits to derive from the incoming signals information to time the bidirectional tracing of the developed rasters, means to cause the selected video modulation signals to initiate the intensity controlled image recreation in successive line traces in a cyclically repeating color order, and means responsive to selected pulse signals to introduce a color phase control of the line scannings subsequent to a whole number of field scannings to establish a color interlace of the color order scanning so that from raster to raster lines of like space location are represented in different component colors of the additive color order.

6. An additive multicolor television receiver having a cathode ray image producing tube to produce light in different component colors of the selected multicolor combination when activated by the therein developed cathode ray scanning beam comprising signal selection circuits for receiving signals containing information to control intensity modulation of the scanning beam and information to control the deflection of the scanning beam in two substantially mutually perpendicular directions relative to the tube target to trace the target along a series of substantially parallel line traces repeating at a field frequency non-integrally related to the line frequency, said signal information for controlling line deflection being in the form of a series of slotted and unslotted pulse signals each substantially uniformly spaced in time relationship with intervening video intensity modulation signals between the major portion of said signals, a line deflection control circuit responsive to each of said pulses for initiating a scanning line in a different color for each said pulse, and a color selection circuit for establishing a changing color order in accordance with each slotted pulse so that the line traces located in similar positions on the developed raster are in progressively changing and controllable color selections.

7. A color television receiver for receiving multicolor television images according to a line sequential color changing sequence with each image field being formed of a plurality of image lines of changing colors from line to line and of a total number of complete lines plus a half line and the lines of successive fields being interlaced in a two-to-one interlace relationship comprising a signal receiving circuit for receiving a series of changing order slotted and unslotted pulse signals substantially uniformly spaced in time relationship from each other and between the major portion of which video signal modulations are present, means to convert the video modulation signals into intensity controlled light traces in controllable component colors of the multicolor selection, means to control the initiation of each line trace under the control of each successively received slotted and unslotted pulse signal and means to establish the color order of conversion of the video signal modulation into line traces of intensity controlled color representations by the slotted pulse signals and to change the color order representations for the line scannings under the control of the slotted pulse signals.

8. In a multicolor additive electronic television image producing device wherein the multicolor image is reproduced upon a luminescent target area of a cathode ray tube under the control of an electronic scanning beam tracing the tube target in a line-for-line manner and reproducing adjacent lines of the resultant image raster in a color different from each of the immediately preceding and the immediately succeeding line traces and wherein the scanning beam is deflected in two mutually perpendicular directions under the control of a pair of deflection generators of which one is operated at a selected field deflection frequency and the other is operated at a frequency of at least eighty times the field deflection frequency and where the generators have a non-integral frequency relationship to each other whereby the line traces of successive raster fields interlace the combination comprising signal receiving and segregating means for receiving trace control signals of a variety including both unslotted pulse and slotted pulse types substantially uniformly spaced in time separation between successive pulses and of a non-uniform repeating sequence, deflection control means responsive to the said segregated signals for controlling the initiation of color scanning traces under the control thereof, and color sequence control means responsive to the slotted signal pulses of the series for initiating an orderly sequence of line scanning traces in each component color of the multicolor and for establishing the said orderly sequence following each slotted pulse independently of the number of intervening unslotted pulses so that a color interlace line scanning pattern trace is superimposed upon the normal line interlace pattern trace.

9. In a multicolor additive electronic television image producing device wherein the multicolor image is reproduced upon a luminescent target area of a cathode ray tube under the control of an electronic scanning beam tracing the tube target in a line-for-line manner and reproducing adjacent lines of the resultant image raster in a color different from each of the immediately preceding and the immediately succeeding line traces and wherein the scanning beam is deflected in two mutually perpendicular directions under the control of a pair of deflection generators of which one is operated at a related field deflection frequency and the other is operated at a frequency of at least eighty times the field deflection frequency and where the generators have a non-integral frequency relationship to each other whereby the line traces of successive raster fields interlace the combination comprising signal receiving and segregating circuits for receiving a combination of slotted and unslotted pulse signals substantially uniformly spaced in time relationship with respect to each other and with the order of slotted and unslotted signals changing relative to each other at spaced time intervals, a scanning beam deflection control circuit responsive to the said pulse signals for controlling each line deflection, and a color order control circuit responsive to the slotted signals only to control the color order of scanning of the several line traces.

10. In a multicolor additive electronic television image producing device wherein the multicolor image is reproduced upon a luminescent target area of a cathode ray tube under the control of an electronic scanning beam tracing the tube target in a line-for-line manner and reproducing adjacent lines of the resultant image raster in a color different from each of the immediately preceding and the immediately succeeding line traces and wherein the scanning beam is deflected in two mutually perpendicular directions under the control of a pair of deflection generators of which one is operated at a related field deflection frequency and the other is operated at a frequency of at least eighty times the field deflection frequency and where the generators have a non-integral frequency relationship to each other whereby the line traces of successive raster fields interlace the combination comprising signal receiving and segregating circuits for receiving a combination of slotted and unslotted pulse signals substantially uniformly spaced in time relationship with respect to each other and with the order of slotted and unslotted signals changing relative to each other at spaced time intervals, a line scanning beam deflection control circuit responsive to the said pulse signals to initiate a line scanning trace coincidentally with the timing of each pulse signal, and a line-scanning color control circuit responsive to the slotted pulse signal to control in accordance therewith the color order of the line scanning of the raster area during each field.

11. In a multicolor additive electronic television image producing device wherein the multicolor image is reproduced upon a luminescent target area of a cathode ray tube under the control of an electronic scanning beam tracing the tube target in a line-for-line manner and reproducing adjacent lines of the resultant image raster in a color different from each of the immediately preceding and the immediately succeeding line traces and wherein the scanning beam is deflected in two mutually perpendicular directions under the control of a pair of deflection generators of which one is operated at a related field deflection frequency and the other is operated at a frequency of at least eighty times the field deflection frequency and where the generators have a non-integral frequency relationship to each other whereby the line traces of successive raster fields interlace the combination comprising signal receiving and segregating circuits for receiving a combination of slotted and unslotted pulse signals having the commencement of each signal uniformly spaced in time relationship from the preceding and succeeding signals without regard to the signal formation, and video modulation signals interposed therebetween to control the intensity modulation of the scanning beam, a scanning line control circuit responsive to each of the pulses independently of the character thereof to initiate a scanning line of the traced raster concurrently with the receipt of the signal, a phase shift circuit to shift the phase of each of the slotted signals relative to the signal commencement so that in time relationship the slotted portion is effective as if it had occurred at a time coinciding with the leading edge thereof, and a color sequence control circuit also responsive to the slotted pulses of the series to initiate a color scanning order for the line traces of the image raster determined by the slotted pulses.

12. In a multicolor additive electronic television image producing device wherein the multicolor image is reproduced upon a luminescent target area of a cathode ray tube under the control of an electronic scanning beam tracing the tube target in a line-for-line manner and reproducing adjacent lines of the resultant image raster in a color different from each of the immediately preceding and the immediately succeeding line traces and wherein the scanning beam is deflected in two mutually perpendicular directions under the control of a pair of deflection generators of which one is operated at a related field deflection frequency and the other is operated at a frequency of at least eighty times the field deflection frequency and where the generators have a non-integral frequency relationship to each other whereby the line traces of successive raster fields interlace the combination comprising signal receiving and segregating circuits for receiving a combination of slotted and unslotted pulse signals having the commencement of each signal uniformly spaced in time relationship from the preceding and succeeding signals without regard to the signal formation, a scanning line control circuit responsive to each of the pulses independently of the character thereof to initiate a scanning line of the traced raster concurrently with the receipt of the signal, a phase shift circuit to shift the phase of each of the slotted signals relative to the signal commencement so that in time relationship the slotted portion is effective as if it had occured at a time coinciding with the leading edge thereof, and a color sequence control circuit also responsive to the slotted pulses of the series to initiate a color scanning order for the line traces of the image raster determined by the slotted pulses.

13. In a color television receiver wherein additive multicolor images are created under the control of video signal modulation representing in sequence successive line traces of the image in the several component colors and interspersed with synchronizing signal pulses and a combined color sequence and synchronizing pulse during each color sequence, the combination comprising means to generate locally a series of pulse signals at a frequency corresponding to that frequency at which the color sequence repeats, a combining and mixing circuit for combining said signals with the composite synchronizing and color sequence and synchronizing pulse signals to produce therefrom image sequence recreating pulses coinciding in phase relationship with the combined color sequence and synchronizing pulse signal, and means to control the image recreation by the video signals in each color of the multicolor in a sequence determined by the phase position of the recreated pulses relative to the synchronizing pulse signals to establish the color order of image recreation.

14. The receiver claimed in claim 13 comprising in addition phase shifting means responsive to the produced image sequence recreating pulses to phase said pulses at uniform time separation between the preceding and succeeding synchronizing pulse signals.

15. Additive multicolor television apparatus wherein electro-optical images are developed by generating an electron beam which is directed upon an electronically responsive target to trace a bidimensional raster thereon, comprising a first sawtooth generator for moving the beam in a first direction relative to the target an integral number of traces of a sawtooth progressive within a unit time period, a second sawtooth generator of a frequency which is high relative to that of the first sawtooth generator for moving the beam in a direction substantially normal to the first direction of beam motion and also through an integral number of traces during the said unit time period, and phase control means operative at the end of each unit time period to shift the phase relationship of the two said generators relative to each other by an amount such that at least one deflection within each unit time period under the control of the higher frequency sawtooth generator changes from normal duration by an amount representing the normal duration divided by the number of additive colors in the multicolor.

16. In a multicolor additive color television receiver wherein electro-optical images are traced upon a target area of a cathode ray tube under the control of an electron beam which is directed upon the target to trace a bidimensional raster thereover, the combination comprising a pair of sawtooth generators for controlling the beam deflection in directions mutually normal to each other, said sawtooth generators operating at frequencies bearing such relationship to each other that one is of the order of several hundred times that of the other and for each cycle of the lower frequency generator the higher frequency generator completes a non-integral number of cycles so that the electron beam normally traces an odd-line interlaced picture over the scanned raster, and phase shifting means for establishing the phase relationship of one of the generators relating to the other at the end of selected cycles of repetition of the lower frequency generator by an amount such that the deflection under the control of the higher frequency generator is varied from its normal duration by an increment representing the normal cyclic duration divided by the number of colors in the additive multicolor so that a second interlaced series of lines of the beam relative to the target area is combined with the odd-line interlaced pattern normally traced under the control of the pair of sawtooth generators.

17. In a multicolor additive color television receiver wherein image rasters are traced upon a cathode ray tube target responsive in selected areas to produce light in different colors under the control of impacting electron beam, the combination comprising a first sawtooth generator to deflect the electron beam relative to the target in a sawtooth pattern to trace a series of substantially parallel paths depicting the image in colors sequentially representing it in the several colors of the additive multicolor, a second sawtooth generator to deflect the beam concurrently in a direction substantially normal to the first direction of deflection to cause the traced paths due to the first deflection to progress across the traced raster, the frequency relationship between the said generators being non-integral so that an odd-line interlaced pattern trace of the raster is developed and successive and adjacent path traces appear in different colors of the multicolor selection, and phase shifting means to change the phase relationship of the generators relative to each other at the end of each odd-line interlace cycle by changing the effective duration of the deflection due to the first sawtooth generator by an amount departing from its normal duration which represents that said time duration divided by the number of colors in the multicolor so that a series of color interlaces is combined with the line interlace and the color sequence is continually modified.

18. In an additive multicolor television device wherein an electronic scanning beam is deflected to traverse the tube target area in paths collectively forming a bidimensional image raster, the combination comprising a pair of sawtooth generators having non-integral relationship one with respect to the other and one being of a frequency at least eighty times that of the other for controlling the scanning beam deflection in planes substantially normal to each other so that an odd-line interlaced raster pattern is normally traced, and a phase shifting element operative at regularly recurring time periods between which the lower frequency sawtooth generator passes through two operating cycles at its operative frequency for modifying the duration of one cycle only of the other of said sawtooth generators so that a second interlaced pattern is superimposed upon the normally developed odd-line interlaces.

19. A cathode ray receiver for reconstructing additive multicolor television images upon a viewing target area in accordance with light of changing intensity developed in a plurality of component-colors in accordance with the tube target section impacted by a signal modulated cathode ray beam which comprises a first sawtooth wave generator to deflect the cathode ray beam in one of two directions of deflection to repeat the complete image field at a selected rate, a second sawtooth generator operating at a frequency at least eighty times as high as that of the first generator and bearing a non-integral relationship to that of the first generator for deflecting the cathode ray to trace the lines of the raster in an odd-line interlaced fashion, means to cause each successive line trace of the raster under the control of the second sawtooth generator to represent each individual line of the assembled image raster in one only of the several component colors of the multicolor with successive line colors changing through the several colors of the multicolor in a cyclic order, and phase shifting means operable at the completion of each second cycle of the first sawtooth generator for changing the cyclic order or line color re-creation so that like line traces for each raster appear in different colors interlaced and superimposed in the first interlace.

20. A cathode ray receiver for reconstructing additive multicolor television images upon a viewing target area in accordance with light of changing intensity developed in a plurality of component-colors in accordance with the tube target section impacted by a signal modulated cathode ray beam which comprises a first sawtooth wave generator to deflect the cathode ray beam in one of two directions of deflection to repeat the complete image field at a selected rate, a second sawtooth generator operating at a frequency at least eighty times as high as that of the first generator and bearing a non-integral relationship to that of the first generator for deflecting the cathode ray to trace the lines of the raster in an odd-line interlaced fashion, means to change the color representation for each line traced on the re-created image raster in a cyclic order between the several component colors of the selected multicolor, and phase shifting means operable at the end of each second cycle of the first named sawtooth generator to change the time duration of one deflection cycle only of the beam under the control of the second sawtooth generator for superimposing a second interlaced pattern on the normal odd-line interlace and for changing the color representation of each line trace to establish a changed line sequence color cycle in each pair of law rate deflections.

21. Television apparatus for transmitting additive multicolor television images in a line-for-line sequence with successive line traces being in color representations different from each preceding and succeeding trace comprising means to develop a series of pulse signals to establish the field rate of scanning a plurality of line traces collectively forming a color image raster, means to develop a second series of pulse signals to control the rate at which each individual line in each produced color image raster is scanned, the frequency of said pulse series bearing a non-integral relationship to each other, means to modify selected pulses of the second series by introducing a slotted portion therein and for controllably maintaining each established order, and means for modifying the established order of pulse and slotted signals at selected time intervals to change thereby the color sequence.

22. Additive color television transmitter apparatus comprising means for producing a series of pulses for controlling the scanning of an optical image along a series of substantially parallel lines of which each successively traced line represents in an orderly sequence a line of the image in a different component color from the preceding and succeeding scanning line and a plurality of said lines forming an image field raster, means for producing a second series of pulses for deflecting the scanning traces in the direction to produce the image field raster at a rate such that a non-integral number of scanning line traces are made in each field raster, means to modify each line pulse signal controlling the line scanning in one of the selected component colors to allocate each color reproduction in the selected color to each modified pulse, and means to shift the modified pulse formation relative to other pulse signals at selected time intervals thereby to control the color sequence of scanning and to advance or retard the phase thereof.

23. In a scanning system for an additive multicolor line sequential television device wherein the several image rasters are each scanned along a series of lines interlaced in a two-to-one relationship relative to each other and wherein successively traced lines are representative of the images scanned in a different component color from the scanning line immediately ahead and behind, a system to control the color line scanning order comprising means to produce a first series of pulse signals at a frequency corresponding to the rate at which each image line is scanned, means to produce a second series of pulse signals under the control of the first series and at a frequency which represents that of the first series divided by the number of component colors in the multicolor operation, means to produce a third series of pulses repeating at a frequency which represents that rate at which each image raster is scanned, means to produce a fourth series of pulses under the control of the third series of pulses and at a frequency which represents that of the third series divided by the product of the number of colors in the multicolor and the interlace relationship of the traced lines of the raster, means for developing from the fourth series of pulses a fifth series of pulse signals of a frequency corresponding to that of the fourth series and of an amplitude varying in stepped relationship in a number of steps per cycle corresponding to the number of component colors in the multicolor, means for developing pulse signals at a frequency corresponding to that at which each image line scanning occurs, means for combining the second series of pulse signals with the line frequency signals to develop a series of signals representing the summation of the said combined signals, means for combining the said summation signals with a second series of line frequency signals to produce an output series of line frequency signals of like frequency wherein line frequency signals which coincide in time with the combined second series of signals and a line synchronizing pulse are slotted and indicate thereby one of the plurality of component color line traces, and means operating under the control of controlled amplitude level fifth series of pulse signals to shift the phase of the second series of pulses so that the slotted line synchronizing pulses are correspondingly shifted and a color shift is effected.

24. An additive multicolor television receiver having a cathode ray image producing tube to produce light in different component colors of the selected multicolor combination when activated by the therein developed cathode ray scanning beam comprising signal selection circuits for receiving signals containing information to control intensity modulation of the scanning beam and information to cotnrol the deflection of the scanning beam in two substantially mutually perpendicular directions relative to the tube target to trace the target along a series of substantially parallel line traces repeating at a field frequency non-integrally related to the line frequency, said sginal information for controlling line deflection being in the form of a series of slotted and unslotted pulse signals each substantially uniformly spaced in time relationship with intervening video intensity modulation signals between the major portion of said signals, a line deflection control circuit responsive to each of said pulses for initiating a scanning line in a different color for each said pulse, and a color selection circuit for establishing a changing color order in accordance with each slotted pulse so that the line traces are progressively changed and controlled to trace different colors at the end of alternately scanned rasters.

25. Color television apparatus comprising an electron-sensitive target area, an electron gun positioned to direct a beam of cathode rays against said area and means for deflecting said beam across said area in two dimensions; a sawtooth wave generator connected to deflect said wave in one of said dimensions and operative at a relatively low frequency which will so deflect said beam an integral number of times in each frame period, a second sawtooth wave generator connected to deflect said beam across said area in the other of said dimensions and also operative so to deflect said beam an integral number of times in each frame period but at a relatively high frequency and at an amplitude sufficient to traverse a plurlity of color fields located side-by-side on said area, means for maintaining the integral relationship between said frequencies throughout each of said frame periods, and means operative at the end of each of said frame periods to change the relationship by a proportion of a cycle of said higher frequency equal to one divided by the number of said color fields.

26. Apparatus in accordance with claim 25 wherein two cycles of said low frequency generator are equal in length to an odd number of cycles of said high frequency generator, and one cycle of one of said frequencies is changed in length at the end of each frame period by an amount eqoal to the length of one cycle of said high frequency divided by the number of said color fields.

27. Apparatus in accordance with claim 25 wherein the number of color fields is three and the length of one cycle of one of said frequencies is changed at the end of each frame period by an amount equal to one-third of the length of one cycle of the higher of said frequencies.

28. Television apparatus comprising an electron-sensitive target area, an electron gun positioned to direct a beam of cathode rays against said area and means for deflecting said beam across said area in two dimensions, a generator of relatively low frequency sawtooth waves connected to deflect said beam in one dimension, a generator of relatively high frequency sawtooth waves connected to deflect said beam in the other dimension, the frequencies of said generators being so related that both generate an integral number of cycles within the same period, and means for shifting the phase of one of said generators with respect to the other at the end of each such period.

29. In combination, a cathode ray tube comprising an electron-sensitive target area, means for generating a beam of cathode rays directed against said area and means for deflecting said beam across said area in two dimensions; and means for scanning said area in an interlaced pattern comprising a generator of sawtooth electrical waves of relatively low frequency, the frequencies of said generators being so related that each accomplishes an integral number of cycles in a common period, and means for shifting the phase of one of said generators at the end of each such period by an amount equivalent to one cycle of said high frequency times the reciprocal of the order of interlace desired.

30. Apparatus in accordance with claim 29 wherein said phase shifting means is operative to shift the phase of said high frequency generator.

31. Apparatus in accordance with claim 29 wherein said period is equal to two cycles of said low frequency oscillator.

32. Apparatus in accordance with claim 29 wherein the shift of phase is equal to one-third of a cycle of said high frequency.

33. Color television apparatus comprising a cathode ray tube including an electron-sensitive target, an electron gun positioned to direct a beam of cathode rays against said target and means for deflecting same beam in two dimensions across said target; an optical system imaging a plurality of laterally adjacent substantially equal areas of said target representative of different color images of the same field of view, a generator of sawtooth electrical waves of relatively low frequency connected to deflect said beam in the direction of the common dimension of said areas, a generator of sawtooth electrical waves of relatively high frequency connected to deflect said beam in the other dimension and of sufficient amplitude to traverse all of said image areas, means timed with said high frequency wave for supplying pulses for blanking said beam at the end of its traversal of each of said areas, and means for selecting certain of said pulses and applying the same to said high frequency generator to determine the phase and frequency thereof.

34. A color television receiver comprising a cathode ray display tube having a luminescent screen and means for deflecting the cathode ray across said screen, a generator of sawtooth electrical waves of relatively low frequency connected to said deflecting means to deflect said ray in one dimension, a generator of sawtooth waves of relatively high frequency, an amplifier responsive to mixed video and synchronizing signals, means connecting to the output of said amplifier to the output of said amplifier responsive only to synchronizing pulses occurring at a frequency higher than that of said high frequency sawtooth generator, and means responsive to the shape of said pulses for selecting certain pulses thereof and injecting the same into said high frequency generator to determine the frequency and phase thereof and shift said phase in accordance with shifts in the order in which successive of said pulses are shaped.

35. Multicolor television apparatus comprising a cathode ray tube having an electron-sensitive target included therein; an electron gun supported within the tube to direct a beam of cathode rays toward said target; means to deflect the developed electron beam across the target in two mutually perpendicular directions; an optical system for imaging a plurality of laterally adjacent substantially equal-size rectangular areas of said target, each of said areas being representative of one component color image of an additive representation of the same field of view; a first sawtooth generator for deflecting the developed electron beam at a relatively low frequency in the direction of the common dimension of said areas; a second sawtooth wave generator of a frequency relatively high compared to that of the first sawtooth wave generator for deflecting the developed cathode ray beam along the other dimension of said substantially equal-size target areas with a deflection amplitude sufficient to cause the beam to traverse all of said areas; means timed with the high frequency deflection of the cathode ray beam for supplying pulses for blanking the said beam in the interval between its traversal of each separate component color image area, and means for selecting certain of the pulses and applying the selected pulses to control the phase and frequency of the higher frequency sawtooth generator.

36. Multicolor television apparatus comprising a cathode ray tube having an electron-sensitive target included therein; an electron gun supported within the tube to direct a beam of cathode rays toward said target; means to deflect the developed electron beam across the target in two mutually perpendicular directions; an optical system for imaging a plurality of laterally adjacent substantially equal-size rectangular areas of said target collectively forming on the target an area of substantially greater width than height, each separate area being representative of one component color image of an additive representation of the same field of view; a first sawtooth generator for deflecting the developed electron beam at one selected frequency in the direction of the shorter dimension of the several image areas; a second sawtooth generator of a frequency relatively high compared to that of the first sawtooth wave generator for deflecting the developed cathode ray beam along the longer dimension of the substantially equal-size target areas with a deflection amplitude sufficient to cause the beam laterally to traverse all of said areas; means timed with the lateral deflection of the cathode ray beam for supplying pulses for blanking the scanning beam in the interval between its traversal of each separate component color image area, and means for selecting from the group of pulses blanking the scanning beam at the intervals between scanning of the separate areas so as to control the frequency and time of initiation of each deflection cycle of the sawtooth generator scanning along the longer dimension of the image areas.

37. In color television apparatus, an optical device to produce on the target area a plurality of closely-spaced, laterally-adjacent image areas each having an aspect ratio substantially corresponding to that of the image to be viewed, and each representing an optical image in a different component color of an additive multicolor; an electron gun to develop an electronic scanning beam to scan said areas to trace a like number of image rasters each having a like number of lines and thereby to develop wave trains of video signals representing the image in its different component colors; bidirectional deflection means to deflect the scanning beam in two substantially mutually perpendicular directions to trace lateral line scanning paths such that one line is traced across each image area during the beam deflection in the first direction, and to trace the said areas so that a plurality of lateral line scanning traces of each area occur during deflection in the direction perpendicular thereto; sync signal developing means to generate a sync control pulse of a first character to indicate each time period of initiation of the scanning trace across a selected one of the individual image areas representing the image in one of its component colors and a sync pulse of a second character to indicate the time period of initiation of the scanning trace across each of the other image areas to represent the image in its other component colors; each character of sync signal having like frontal formation so as to be capable of maintaining synchronous operation of monochrome reception, and said first character of sync signal being of a formation to identify one only of the component colors of a multicolor; and means to combine for transmission the developed video signals and the two types of sync signals to produce a plurality of interspersed series of video and sync signals during each scansion.

38. Multicolor television apparatus comprising an optical device to image in a target area a plurality of closely-spaced and laterally adjacent substantially equal image areas each representing an optical image in a different component color of an additive multicolor image, an electron gun to develop an electronic scanning beam to scan each of said areas on the target and thereby to trace a like number of image rasters representing an image in different color, each having a like number of scanning lines; bidirectional deflection means to deflect the scanning beam in one direction to trace lateral line scanning paths across the images on the target such that in one lateral sweep of the beam one scanning line is traced across each of the component-color image areas and concurrently to deflect the beam in a second direction substantially perpendicular to the line scanning paths so that a plurality of lateral line scanning traces of each area occur during deflection in the second direction; means timed with the high frequency deflection of the cathode ray beam for supplying pulses for blanking the said beam in the interval between its traversal of each separate component color image area, and means for selecting certain of the pulses and applying the selected pulses to control the phase and frequency of the higher frequency sawtooth generator.

39. Multicolor television apparatus comprising an optical device to image on a target area a plurality of closely-spaced and laterally adjacent substantially equal image areas each representing an optical image in a different component color of an additive multicolor image, an electron gun to develop an electronic scanning beam to scan each of said areas on the target and thereby to trace a like number of image rasters representing an image in different color, each having a like number of scanning lines; bidirectional deflection means to deflect the scanning beam in one direction to trace lateral line scanning paths across the images on the target such that in one lateral sweep of the beam one scanning line is traced across each of the component-color image areas and concurrently to deflect the beam in a second direction substantially perpendicular to the line scanning paths so that a plurality of lateral line scanning traces of each area occur during deflection in the second direction; means normally to transmit a single sync pulse of the first character and a plurality of sync pulses of the second character during each lateral deflection of the scanning beam in one direction, and means operative at recurring periods subsequent to a plurality of deflections of the scanning beam in the second direction of deflection for modifying during at least one complete lateral deflection the number of sync pulses of the second character intervening between successive sync pulses of the first character.

40. In color television apparatus, a target area, an optical device to register on the target area a plurality of closely-spaced laterally adjacent image areas collectively forming a rectangular area, and each area representing a polychrome image in one only of a plurality of component-colors of an additive multicolor combination, means to develop a cathode ray scanning beam to scan the target, beam deflection means to cause said beam to scan the target in a substantially rectangular pattern with the scanning thereof in the long dimension being of the order of eighty times the rate of scanning in the short dimension, said deflection of the beam in the long dimension of the formed rectangular image area being of such amplitude that one line trace of each component color image is scanned, a generator to develop a sync pulse of a first wave formation to control the initiation of each scanning of the long dimension of the rectangular image area, a generator to develop a sync pulse of a second wave formation intermediate the scanning of each other component-color image area during the scansion, the first and second wave formation signals having similar initial wave formation so that for monochrome reception each signal will control the initiation of one line of the composite image and for color reception the signals of one of the two wave forms will control the color order of selection.

GEORGE E. SLEEPER, Jr.

References Cited in the file of this patent

UNITED STATES PATENTS

| Number | Name | Date |
|---|---|---|
| 2,200,285 | Lorenzen | May 14, 1940 |
| 2,272,638 | Hardy | Feb. 10, 1942 |
| 2,296,908 | Crosby | Sept. 29, 1942 |
| 2,319,789 | Chambers | May 25, 1943 |
| 2,378,746 | Beers | June 19, 1945 |
| 2,389,646 | Sleeper | Nov. 27, 1945 |
| 2,428,946 | Somers | Oct. 14, 1947 |
| 2,461,515 | Bronwell | Feb. 15, 1949 |
| 2,518,199 | Sziklai | Oct. 3, 1950 |

FOREIGN PATENTS

| Number | Country | Date |
|---|---|---|
| 64,937 | Denmark | Oct. 14, 1946 |
| 231,805 | Switzerland | Sept. 9, 1942 |
| 562,334 | Great Britain | Oct. 8, 1942 |
| 860,541 | France | Sept. 12, 1939 |